(12) United States Patent
Yamada

(10) Patent No.: US 10,477,357 B2
(45) Date of Patent: *Nov. 12, 2019

(54) POPULATION ESTIMATING APPARATUS, PROGRAM AND POPULATION ESTIMATING METHOD

(71) Applicant: AGOOP Corp., Tokyo (JP)

(72) Inventor: Yutaka Yamada, Tokyo (JP)

(73) Assignee: AGOOP Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/141,919

(22) Filed: Sep. 25, 2018

(65) Prior Publication Data

US 2019/0028852 A1 Jan. 24, 2019

Related U.S. Application Data

(63) Continuation of application No. PCT/JP2016/060484, filed on Mar. 30, 2016.

(51) Int. Cl.
*H04M 1/00* (2006.01)
*H04W 4/029* (2018.01)
(Continued)

(52) U.S. Cl.
CPC ............ *H04W 4/029* (2018.02); *G06Q 50/10* (2013.01); *H04W 4/021* (2013.01)

(58) Field of Classification Search
CPC ....... H04W 4/029; H04W 4/021; G06Q 50/10
(Continued)

(56) References Cited

U.S. PATENT DOCUMENTS 9,978,075 B2 * 5/2018 Shibayama ............ G06Q 50/10
2012/0094686 A1 4/2012 Suzuki
(Continued)

FOREIGN PATENT DOCUMENTS

EP 2000962 A1 12/2008
JP 2005202546 A 7/2005
(Continued)

OTHER PUBLICATIONS

International Search Report for International Patent Application No. PCT/JP2016/060484, issued by the Japan Patent Office dated Jul. 5, 2016.
(Continued)

*Primary Examiner* — Amancio Gonzalez

(57) ABSTRACT

A population or a population change in an particular area is accurately estimated based on the number of communication terminals existing in the area. An input-unit to input input information indicating a geographic range and time of population estimation; a first-terminal-extracting-unit to extract wireless terminals existing in the geographic range and at the time indicated by the input information; a relation-parameter-extracting-unit to refer to a relation parameter storing unit to store relation parameter predetermined for each wireless terminal, which is a parameter to represent relation between the number of wireless terminals and population, and extract a relation parameter applied to a wireless terminal extracted by the first terminal extracting unit; and an estimation-value-deriving-unit to derive an estimation value of a population in the geographic range and at the time indicated by the input information, based on the relation parameter extracted by the relation parameter extracting unit are included.

18 Claims, 15 Drawing Sheets

(51) Int. Cl.
*G06Q 50/10* (2012.01)
*H04W 4/021* (2018.01)
(58) Field of Classification Search
USPC .................................................. 455/456.1
See application file for complete search history.

(56) References Cited

U.S. PATENT DOCUMENTS

| 2012/0115476 A1* | 5/2012 | Shin .................. G06Q 10/06 |
| | | 455/435.1 |
| 2012/0209658 A1 | 8/2012 | Shibayama |
| 2013/0090132 A1 | 4/2013 | Terada |
| 2013/0137459 A1 | 5/2013 | Kobayashi |
| 2016/0260022 A1 | 9/2016 | Yamada |
| 2016/0261991 A1 | 9/2016 | Yamada |

FOREIGN PATENT DOCUMENTS

| JP | 2010140074 A | 6/2010 |
| JP | 2010200283 A | 9/2010 |
| JP | 2013097471 A | 5/2013 |
| WO | 2009107618 A1 | 9/2009 |
| WO | 2010113706 A1 | 10/2010 |
| WO | 2011021606 A1 | 2/2011 |

OTHER PUBLICATIONS

International Search Report for International Patent Application No. PCT/JP2014/078414, issued by the Japan Patent Office dated Jan. 27, 2015.
International Preliminary Report on Patentability for International Application No. PCT/JP2014/078414, issued by the International Bureau of WIPO dated Apr. 25, 2017.
Office Action issued for counterpart Japanese Application 2015-562232, drafted by the Japan Patent Office dated Dec. 12, 2016.
Extended European Search Report for European Patent Application No. 14904464.6, issued by the European Patent Office dated Jul. 6, 2017.
Extended European Search Report for European Patent Application No. 16896870.9, issued by the European Patent Office dated Nov. 15, 2018.

* cited by examiner

*FIG. 8*

| TERMINAL ID OF TERMINAL IN X CITY AT 3:00 P.M. ON SEPTEMBER 1, 2014. | AREA ID OF LOCAL AREA IN WHICH EACH TERMINAL EXISTS AT 3:00 A.M. ON SEPTEMBER 1, 2014. |
|---|---|
| T1001 | A0001 |
| T1004 | A0001 |
| T1007 | A0002 |
| T0010 | A0005 |
| : | : |

| AREA ID OF LOCAL AREA IN WHICH EACH TERMINAL EXISTS AT 3:00 A.M. ON SEPTEMBER 1, 2014 | NUMBER OF TERMINAL ID OF EACH LOCAL AREA |
|---|---|
| A0001 | 100 |
| A0002 | 200 |
| A0005 | 500 |
| A0008 | 800 |
| ⋮ | ⋮ |

| TERMINAL ID | TERMINAL POSITION | ACQUIRING TIME |
|---|---|---|
| T0001 | * * * | 2012/12/10 ⋯ |
| T0001 | * * * | 2012/12/10 ⋯ |
| ⋮ | ⋮ | ⋮ |
| T0002 | * * * | 2012/12/11 ⋯ |
| T0002 | * * * | 2012/12/11 ⋯ |
| ⋮ | ⋮ | ⋮ |
| T0003 | * * * | 2012/12/12 ⋯ |
| T0003 | * * * | 2012/12/12 ⋯ |
| ⋮ | ⋮ | ⋮ |

*FIG. 11*

| TOTAL TERMINAL ID | VALIDATION PERIOD | TERMINAL ID IN THE PERIOD |
|---|---|---|
| 0001 | 2014/9/1 | T0001 |
| 0002 | 2014/9/1 | T0002 |
| ... | ... | ... |
| *** | 2014/9/1 | *** |
| *** | 2014/9/2 | T0001 |
| ... | ... | ... |
| *** | 2014/9/2 | *** |
| ... | ... | ... |

| PARAMETER ID 1312 | AREA ID OF APPLICABLE AREA 1314 | APPLIED TIME SEGMENT 1316 | PARAMETER BEFORE CORRECTION 1322 | PARAMETER AFTER CORRECTION 1324 |
|---|---|---|---|---|
| P0001 | A0001 | 06:01–9:00 | *** | *** |
| P0002 | A0001 | 09:01–15:00 | *** | *** |
| P0003 | A0001 | 15:01–21:00 | *** | *** |
| P0004 | A0001 | 21:01–06:00 | *** | *** |
| P0005 | A0002 | 06:01–9:00 | *** | *** |
| P0006 | A0002 | 09:01–15:00 | *** | *** |
| P0007 | A0002 | 15:01–21:00 | *** | *** |
| P0008 | A0002 | 21:01–06:00 | | |
| ·· | ·· | ·· | ·· | ·· |

1300

1400

| AREA ID | GEOGRAPHICAL RANGE OF THE AREA |
|---|---|
| A0001 | THE ENTIRE AREA OF JAPAN |
| A0002 | THE ENTIRE AREA OF TOKYO |
| A0003 | A PARTICULAR AREA 1 OF TOKYO |
| A0004 | A PARTICULAR AREA 2 OF TOKYO |
| ⋮ | ⋮ |
| A**** | THE ENTIRE AREA OF OSAKA |
| ⋮ | ⋮ |
| A**** | THE ENTIRE AREA OF KYOTO |
| ⋮ | ⋮ |

| 1500 | | | | | |
|---|---|---|---|---|---|
| TERMINAL ID 1512 | VALIDATION PERIOD OF TERMINAL ID 1514 | APPLIED TIME SEGMENT 1516 | PARAMETER BEFORE CORRECTION [PERSONS/TERMINAL] 1522 | PARAMETER AFTER CORRECTION [PERSONS/TERMINAL] 1524 |
|---|---|---|---|---|
| T0001 | 2014/9/1 | 06:01–9:00 | *** | *** |
| T0001 | 2014/9/1 | 09:01–15:00 | *** | *** |
| T0001 | 2014/9/1 | 15:01–21:00 | *** | *** |
| T0001 | 2014/9/1 | 21:01–06:00 | *** | *** |
| T0001 | : | : | : | : |
| T0002 | 2014/9/1 | 06:01–9:00 | *** | *** |
| T0002 | 2014/9/1 | 09:01–15:00 | *** | *** |
| T0002 | 2014/9/1 | 15:01–21:00 | *** | *** |
| T0002 | 2014/9/1 | 21:01–06:00 | *** | *** |
| T0002 | : | : | : | : |

*FIG. 15*

POPULATION ESTIMATING APPARATUS, PROGRAM AND POPULATION ESTIMATING METHOD

The contents of the following PCT application are incorporated herein by reference:
NO. PCT/JP2016/060484 filed on Mar. 30, 2016.

BACKGROUND

1. Technical Field

The present invention relates to a population estimating apparatus, program, and a population estimating method.

2. Related Art

It is known to estimate floating population based on a survey result value for each facility type (refer to Patent Document 1). Also, it is known to identify floating population using communication terminals (refer to Patent Documents 2 to 7).

PRIOR ART DOCUMENTS

Patent Document 1: WO 2011/024379.
Patent Document 2: Japanese Patent Application Publication No. 2013-97471.
Patent Document 3: Japanese Patent Application Publication No. 2005-202546.
Patent Document 4: Japanese Patent Application Publication No. 2010-200283.
Patent Document 5: WO 2010/113706.
Patent Document 6: WO 2010/116916.
Patent Document 7: WO 2011/021606.

However, a method for accurately estimating population or population change in a particular area based on the number of communication terminals existing in the area is not known.

SUMMARY

General Disclosure

Therefore, the purpose of one aspect of the technical innovation included in this specification is to provide an attribution determining apparatus, a communication terminal, an attribution determining method, a program and a recording medium which can solve the problem described above. This purpose is achieved by a combination of features described in the claims. A first aspect of the present invention provides a population estimating apparatus. The population estimating apparatus described above includes an input unit to input input information indicating a geographic range and time of population estimation. The population estimating apparatus described above includes a first terminal extracting unit to: refer to a log information storing unit to store log information in which one or more pieces of positional information indicating respective positions of one or more wireless terminals are associated with time information indicating the time at which each of the one or more pieces of positional information is acquired; and extract wireless terminals existing in a geographic range indicated by input information at time indicated by the input information. The population estimating apparatus described above includes a relation parameter extracting unit to: refer to a relation parameter storing unit to store a relation parameter predetermined for each wireless terminal, which is a parameter to represent relation between the number of wireless terminals and population; and extract relation parameters to apply to wireless terminals extracted by the first terminal extracting unit. The population estimating apparatus described above includes an estimation value deriving unit to derive an estimation value of a population in a geographic range indicated by the input information at time indicated by the input information based on the relation parameters extracted by the relation parameter extracting unit.

In the population estimating apparatus described above, the relation parameter storing unit may store the relation parameter associated with a time segment to which the relation parameter applies. In the population estimating apparatus described above, the relation parameter extracting unit may refer to the relation parameter storing unit, and extract the relation parameter applied to the wireless terminals extracted by the first terminal extracting unit at time indicated by the input information. In the population estimating apparatus described above, the predetermined time segment may be at least one selected from a group consisting of 1 day, 1 week, 1 month, 3 months, 6 months, 1 year, weekdays, holidays, and each day of the week, and each time period. If a time interval indicated by time information included in two pieces of temporally continuous log information, among a plurality of pieces of log information associated with at least one of the one or more wireless terminals, is larger than a predetermined value, the population estimating apparatus described above may include an interpolation information generating unit to generate information for interpolating the two pieces of log information.

The population estimating apparatus described above may include a population information acquiring unit to acquire local population information indicating a population of a local area with a predetermined geographic range. The population estimating apparatus described above may include a second terminal extracting unit to refer to the log information storing unit and extract wireless terminals existing in a local area at particular time. The population estimating apparatus described above may include a relation parameter deriving unit to derive a relation parameter based on the population of the local area indicated by the local population information and the number of wireless terminals extracted by the second terminal extracting unit. In the population estimating apparatus described above, the relation parameter storing unit may store, with respect to at least a part of the wireless terminals extracted by the first terminal extracting unit, terminal identification information to identify the at least a part of the wireless terminals and the relation parameters derived by the relation parameter deriving unit, such that they are associated with each other. The population estimating apparatus described above may include a classifying unit to respectively classify the wireless terminals extracted by the first terminal extracting unit into wireless terminals that have stayed in the geographic range indicated by the input information and wireless terminals that have transited the geographic range indicated by the input information based on the log information.

A second aspect of the present invention provides a population estimating apparatus. The population estimating apparatus described above includes a population information acquiring unit to acquire local population information indicating a population of a local area with a predetermined geographic range. The population estimating apparatus described above includes a second terminal extracting unit to: refer to a log information storing unit to store log information in which one or more pieces of positional information indicating respective positions of one or more wireless terminals are associated with time information indicating the time at which each of the one or more pieces of positional information is acquired; and extract wireless terminals existing in a local area at a particular time. The population estimating apparatus described above includes a relation parameter deriving unit to derive a parameter which is: used for estimating population based on the population of the local area indicated by the local population information and the number of wireless terminals extracted by the second terminal extracting unit; and is a relation parameter representing a relation between the number of wireless terminals and the population. The population estimating apparatus described above includes a relation parameter storing unit to store, with respect to at least a part of the wireless terminals extracted by the second terminal extracting unit, terminal identification information to identify the at least a part of the wireless terminals and the relation parameters derived by the relation parameter deriving unit, such that they are associated with each other.

In the population estimating apparatus described above, the particular time may be any time or period between 8:00 p.m. and 8:00 a.m. In the population estimating apparatus described above, the population information acquiring unit may further acquire wide area population information indicating a population of a wide area including the local area. In the population estimating apparatus described above, the relation parameter deriving unit may have a proportionality factor deriving unit to derive a proportionality factor from the local area by dividing the population of the local area indicated by the local population information by the number of wireless terminals extracted by the second terminal extracting unit. In the population estimating apparatus described above, the relation parameter deriving unit may have a correction unit to correct the proportionality factor based on the wide area population information and derive the relation parameter. In the population estimating apparatus described above, the wide area population information may include: de jure population information indicating a de jure population in the wide area; and inflow population information indicating a population that flowed inside the wide area from outside the wide area.

A third aspect of the present invention provides a program for causing a computer to function as the population estimating apparatus described above. A non-volatile computer-readable recording medium having a program for causing a computer to function as the population estimating apparatus described above recorded thereon may also be provided.

A fourth aspect of the present invention provides a population estimating method. The population estimating method described above has an inputting step to input input information indicating a geographic range and time of population estimation. The population estimating method described above has a first terminal extracting step to: refer to a log information storing unit to store log information in which one or more pieces of positional information indicating respective positions of one or more wireless terminals are associated with time information indicating the time at which each of the one or more pieces of positional information is acquired; and extract wireless terminals existing in a geographic range indicated by input information at time indicated by the input information. The population estimating method described above has a relation parameter extracting step to: refer to a relation parameter storing unit to store relation parameters predetermined for each wireless terminal, which is a parameter to represent relation between the number of wireless terminals and population; and extract relation parameters to apply to wireless terminals extracted in the first terminal extracting step. The population estimating method described above has an estimation value deriving step to derive estimation value of a population in a geographic range indicated by the input information at time indicated by the input information based on the relation parameters extracted in the relation parameter extracting step.

The population estimating method described above may have a population information acquiring step to acquire local population information indicating a population of a local area with a predetermined geographic range. The population estimating method described above may have a second terminal extracting step to refer to the log information storing unit and extract wireless terminals existing in a local area at particular time. The population estimating method described above may have a relation parameter deriving step to derive relation parameters based on the population of the local area indicated by the local population information and the number of wireless terminals extracted in the second terminal extracting step. In the population estimating method described above, the relation parameter storing unit may store, with respect to at least a part of the wireless terminals extracted in the second terminal extracting step, terminal identification information to identify the at least a part of the wireless terminals and the relation parameters derived in the relation parameter deriving step, such that they are associated with each other. If a time interval indicated by time information included in two pieces of temporally continuous log information, among a plurality of pieces of log information associated with at least one of the one or more wireless terminals, is larger than a predetermined value, the population estimating method described above may have an interpolation information generating step to generate information for interpolating the two pieces of log information.

BRIEF DESCRIPTION OF THE DRAWINGS

FIG. 8 schematically illustrates one example of a processing result in an area determining unit 714.

FIG. 9 schematically illustrates one example of a processing result in a terminal quantity deriving unit 716.

FIG. 11 schematically illustrates one example of a data table 1100.

FIG. 12 schematically shows one example of a data table 1200.

FIG. 13 schematically shows one example of a data table 1300.

FIG. 14 schematically shows one example of a data table 1400.

FIG. 15 schematically shows one example of a data table 1500.

DESCRIPTION OF EXEMPLARY EMBODIMENTS

Figure 1:
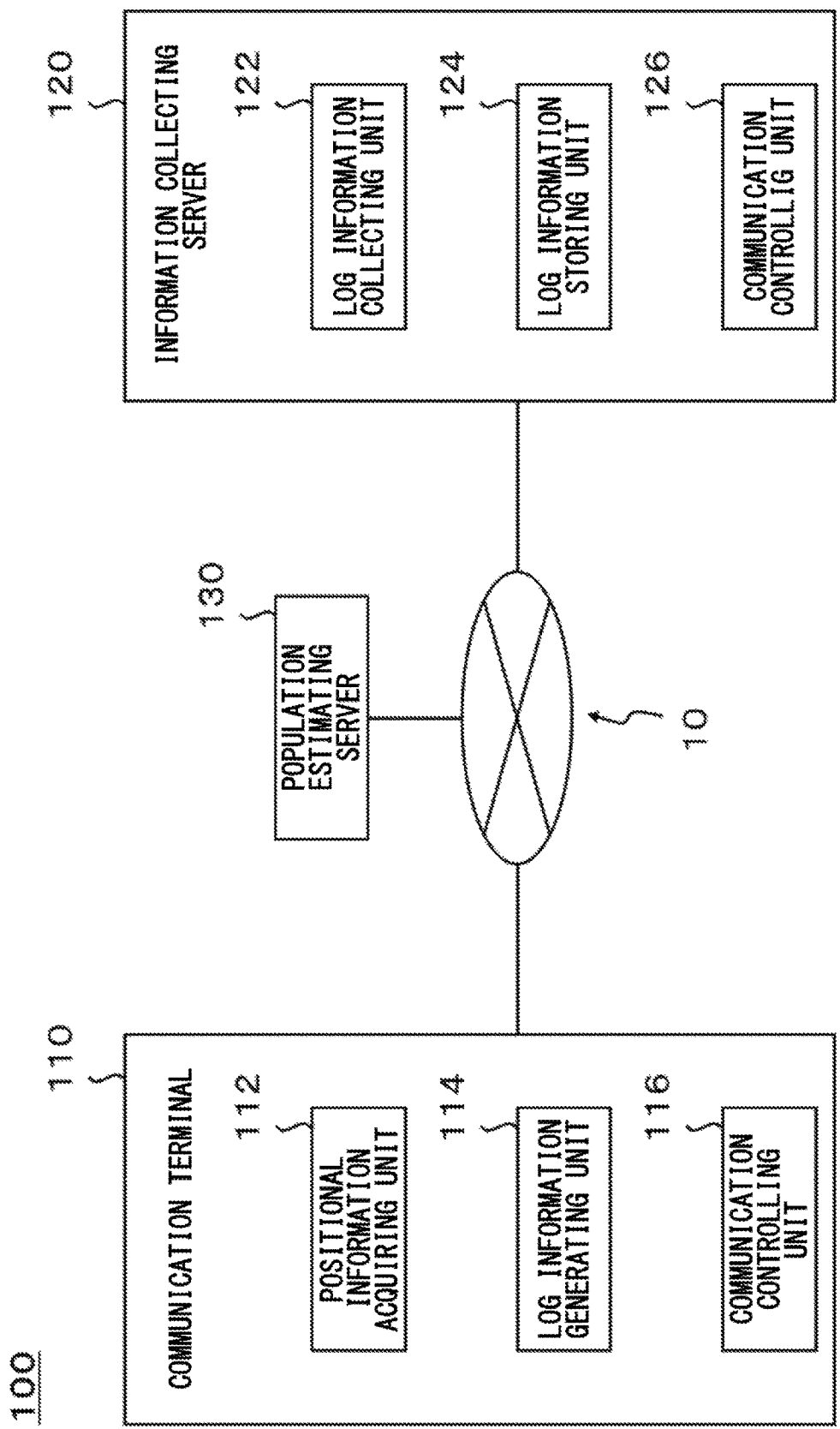
FIG. 1 schematically illustrates one example of a population estimating system 100.

Hereinafter, one aspect of the present invention is described through embodiments of the invention. However, the following embodiments shall not be construed as limiting the claimed invention. Also, every combination of features described with respect to the embodiments should not be considered essential to means provided by aspects of the invention. Note that, the same reference numerals may be used for the same or similar portions throughout the drawings for the purpose of omitting redundant descriptions.

FIG. 1 schematically illustrates one example of a population estimating system 100. The population estimating system 100 estimates a population or population movement in an arbitrary area. In the present embodiment, the population estimating system 100 estimates a population or population movement by using positional information of one or more communication terminals 110. It is sufficient if the arbitrary area is a division with a predetermined geographic range, for example, an administrative division (which may be referred to as an administrative segment, an administrative district, or the like), a division used in the case of conducting a national census, a division made by subdividing an area by an unit region with a predetermined size and shape (which may be referred to as an area mesh or the like), etc.

In the present embodiment, the population estimating system 100 includes a communication terminal 110, an information collecting server 120, and a population estimating server 130. The communication terminal 110 has a positional information acquiring unit 112, a log information generating unit 114, and a communication controlling unit 116. Also, the information collecting server 120 has a log information collecting unit 122, a log information storing unit 124, and a communication controlling unit 126. The population estimating system 100 and the population estimating server 130 may be an example of the population estimating apparatus respectively. The communication terminal 110 may be one example of one or more wireless terminals. The information collecting server 120 and the log information collecting unit 122 may be an example of log information acquiring units respectively.

Each of the communication terminal 110, the information collecting server 120, and the population estimating server 130 may transmit/receive information with one another via a communication network 10. The communication network 10 may be a transmission path for wired communication, or may be a transmission path for wireless communication, or may be a combination of the transmission path for wireless communication and the transmission path for wired communication. The communication network 10 may be a mobile communication network such as a cellular phone network, a wireless packet communication network, the Internet and a dedicated line, or a combination thereof.

The communication terminal 110 has a communication function. The communication terminal 110 may have a wireless communication function. The communication terminal 110 may also correspond to a plurality of communication systems. For example, the communication terminal 110 corresponds to both communication systems of a mobile communication system such as 3G, LTE, or 4G, and a wireless communication system such as Wi-Fi (registered trademark) or WiMAX (registered trademark). It is sufficient if the communication terminal 110 is an apparatus that can transmit/receive information to/from at least one of the information collecting server 120 and the population estimating server 130, and may be a personal computer, a cellular phone or a smart phone, a mobile terminal (for example, a PDA, a tablet, a notebook computer or a laptop computer or the like), a wireless terminal, or the like, which has Web browser software introduced therein, for example.

The communication terminal 110 may be realized in an information processing apparatus of a general configuration by activating software or a program in which an operation of each unit of the communication terminal 110 is specified. The information processing apparatuses used as the communication terminal 110 may include: a data processing apparatus having a processor such as a CPU, an ROM, an RAM, a communication interface and the like; an input apparatus such as a keyboard, a touch panel, a microphone, a GPS information acquiring apparatus, an acceleration sensor, or a gyroscope sensor; an output apparatus such as a display apparatus, a speaker, or a vibration apparatus; and a storage apparatus such as a memory or an HDD. The data processing apparatus or the storage apparatus may store the software or the program described above. By being executed by a processor, the software or the program described above causes the information processing apparatus described above to execute operations specified by the software or the program.

The positional information acquiring unit 112 to acquire positional information indicating a position of the communication terminal 110. The positional information may be information indicating latitude and longitude, and may further include information indicating altitude. The positional information may also be information indicating an address. The positional information acquiring unit 112 may acquire the positional information of the communication terminal 110 based on a GPS signal received from a GPS satellite. The positional information of the communication terminal 110 may be acquired based on electric field intensities of radio waves and the like received from one or more base stations or access points of the communication network 10. The positional information of the communication terminal 110 may be acquired based on electric field intensities of radio waves and the like from the communication terminal 110 at one or more base stations or access points of the communication network 10.

The positional information acquiring unit 112 may also acquire information regarding accuracy of the positional information (which may be referred to as positioning accuracy information). The accuracy of the positional information is represented by, for example, using a CEP (Circular Error Probability). If a probability of a GPS receiver being within a particular circle is 50%, the CEP is represented as a radius of the circle. If the GPS receiver is at a location likely to receive GPS signals (for example, outdoors, by an indoor window, or the like), the CEP has a small value. On the other hand, if the GPS receiver is at a location unlikely to receive GPS signals, the CEP has a large value.

The positional information acquiring unit 112 may acquire the positional information at a predetermined time or may also acquire the positional information at a predetermined time interval. The positional information acquiring unit 112 may also acquire the positional information if a user executes a predetermined operation by using the communication terminal 110. The predetermined operation is, for example, an input/selection operation of information, a power ON/OFF operation, and a start/end operation of calling, or the like. The positional information acquiring unit 112 may also acquire the positional information in the background.

The log information generating unit 114 respectively associates one or more pieces of positional information acquired by the positional information acquiring unit 112 with time information indicating time at which the positional information is acquired, and generates one or more pieces of log information. The log information generating unit 114 may also associate terminal identification information for identifying each of the one or more communication terminals 110, the positional information, and the time information with one another and generate the log information. The log information generating unit 114 may also associate the positional information, the positioning accuracy information, and the time information with one another and generate the log information. The log information generating unit 114 may also associate the terminal identification information, the positional information, the positioning accuracy information, and the time information with one another and generate the log information. In the present embodiment, the log information generating unit 114 transmits the generated log information to the information collecting server 120.

The terminal identification information is not particularly limited as long as it is information that can identify each of the one or more communication terminals 110. In one embodiment, the following items are used as the terminal identification information for example: a MAC address of the communication terminal 110; a BD address (which may be referred to as a BD_ADDR and the like) for identifying a device supporting Bluetooth (registered trademark); an ID specific to a communication terminal, such as an address for identifying a device supporting ZigBee (registered trademark); an ID specific to a communication terminal recorded in any type of SIM (Subscriber Identity Module) card; and an ID specific to each subscriber of a communication terminal (which may be referred to as a subscriber-specific ID. Also, depending on a communication carrier, it may be referred to as a terminal manufacturing number, a user ID, an i mode (registered trademark) ID, a subscriber ID, an EZ number, a terminal serial number and the like), which is assigned to the subscriber, etc.

In another embodiment, information that can uniquely identify the communication terminal 110 while reducing the chance of identifying its user is used as the terminal identification information. Accordingly, the log information can be analyzed without identifying a user by taking a temporal relationship between the log information into consideration. For example, a code string that is randomly selected is provided as the terminal identification information of a particular communication terminal 110. The code string may be a code string specific to each of the one or more communication terminals 110, or may be reused among a plurality of communication terminals 110. The terminal identification information may be updated in each predetermined period, may be updated at a predetermined time, or may be updated at arbitrary timing in response to an instruction from a user and the like.

The communication controlling unit 116 controls communication among the communication terminal 110, the communication network 10, and at least one of the information collecting server 120 and the population estimating server 130. The communication controlling unit 116 may be a communication interface. The communication controlling unit 116 may correspond to a plurality of communication systems.

The information collecting server 120 collects any type of information such as the log information. The log information collecting unit 122 collects the log information. In one embodiment, a log information collecting unit 122 respectively receives one or more pieces of log information from one or more communication terminals 110. In another embodiment, a log information collecting unit 122 respectively receives one or more pieces of log information from one or more base stations or access points of a communication network 10.

The log information storing unit 124 stores the log information collected by the log information collecting unit 122. The log information storing unit 124 may also transmit the log information to the population estimating server 130 in response to a request from the population estimating server 130.

The communication controlling unit 126 controls communication among the information collecting server 120, the communication network 10, and at least one of the communication terminal 110 and the population estimating server 130. The communication controlling unit 126 may be a communication interface. The communication controlling unit 126 may correspond to a plurality of communication systems.

The population estimating server 130 estimates a population or population movement in an arbitrary area. In the present embodiment, the population estimating server 130 estimates a population or population movement in an arbitrary area by using the log information collected by the information collecting server 120. The population estimating server 130 may estimate a total population or an average population in an arbitrary area.

When a population or population movement in a particular period is estimated, a single communication terminal 110 may move within a plurality of areas. In this case, if estimating a total population of a particular area included in the plurality of areas described above, the single communication terminal 110 described above is counted as one communication terminal at least in the particular area described above. In all areas included in the plurality of areas described above, the single communication terminal 110 described above may also be counted as one communication terminal.

On the other hand, if estimating an average population of a particular area included in the plurality of areas described above, at least in the particular area described above, a count value in which a weight factor is considered as a count value of the single communication terminal 110 described above is used. The count value in which the weight factor is considered may be determined based on the number of the plurality of areas described above. The count value in which the weight factor is considered may be determined based on the number of the plurality of areas described above, and at least one of a stay time and a moving distance of the communication terminal 110 in each area.

For example, if a communication terminal 110 exists in three areas (for example, an area A, an area B, and an area C) in a particular period, a count value of the communication terminal 110 in each area is counted as ⅓. In another embodiment, for example, if a ratio of stay times of a communication terminal 110 in an area A, an area B, and an area C is 1:2:1, count values in the area A, the area B, and the area C are counted as ¼, ½ and ¼, respectively.

Each of the information collecting server 120 and the population estimating server 130 may be realized, in an information processing apparatus of a general configuration, by activating software or a program in which an operation of each unit of each of the information collecting server 120 and the population estimating server 130 is specified. The information processing apparatuses used as the information collecting server 120 and the population estimating server 130 may include: a data processing apparatus having a processor such as a CPU, an ROM, an RAM, a communication interface or the like; an input apparatus such as a keyboard, a touch panel, a microphone; an output apparatus such as a display apparatus or a speaker, and a storage apparatus such as a memory or an HDD. The data processing apparatus or the storage apparatus may store the software or the program described above. By being executed by a processor, the software or program described above causes the information processing apparatus described above to execute operations specified by the software or the program.

Each of the information collecting server 120 and the population estimating server 130 may be a virtual server or a cloud system. Each of the information collecting server 120 and the population estimating server 130 may be realized by a single server, or may be realized by a plurality of servers. Also, the information collecting server 120 and the population estimating server 130 may be realized on the same physical server, or the information collecting server 120 and the population estimating server 130 may be the same server.

Figure 2:
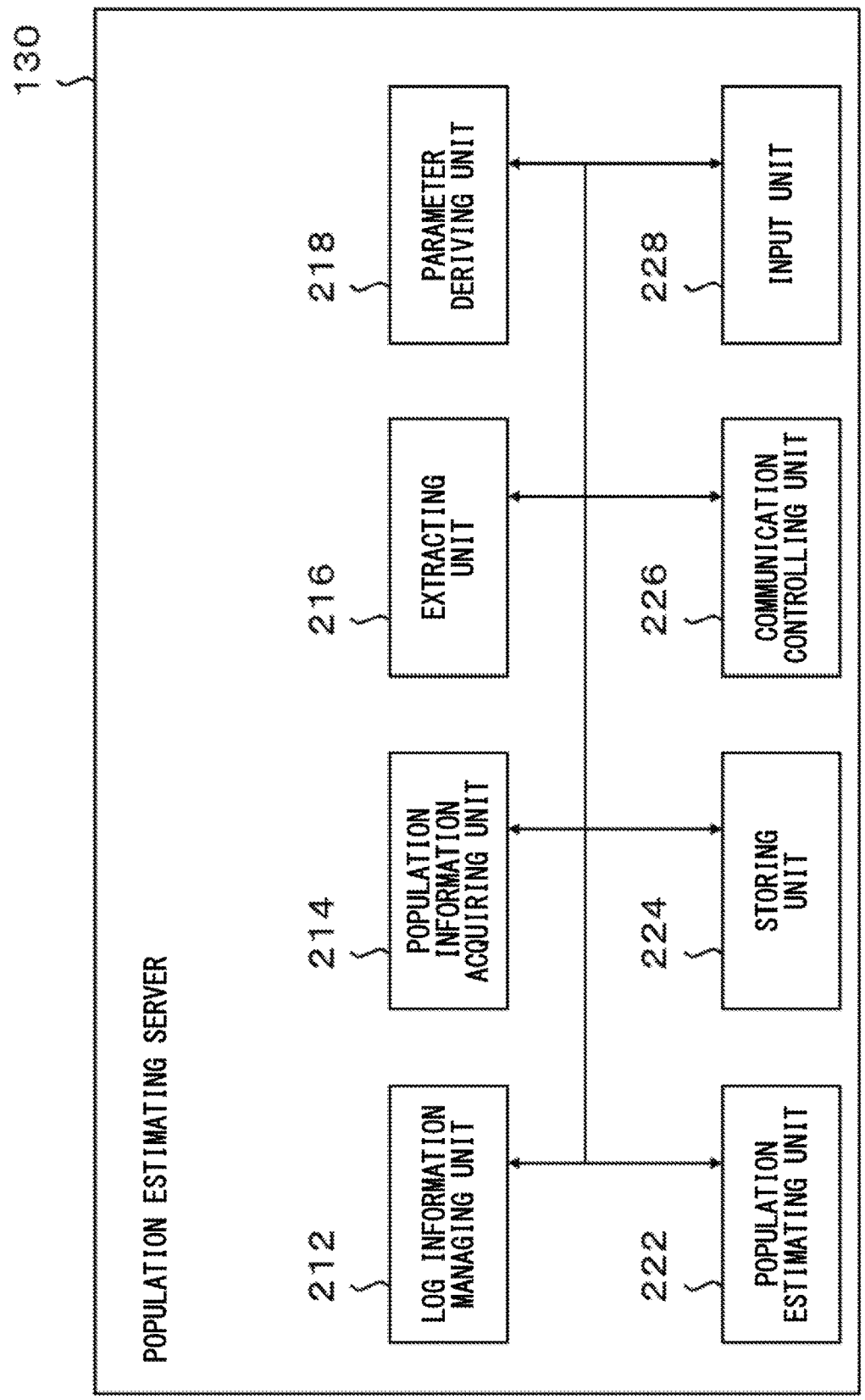
FIG. 2 schematically illustrates one example of a population estimating server 130.

FIG. 2 schematically illustrates one example of a population estimating server 130. In the present embodiment, the population estimating server 130 executes (i) an interpolation process of the log information, (ii) a deriving process of a relation parameter representing a relation between the number of wireless terminals and a population, (iii) a population estimating process in an arbitrary area, or the like.

For example, the population estimating server 130 executes (i) the interpolation process of the log information and suppresses a fluctuation of frequencies or time intervals for acquiring the log information by the communication terminal 110. The population estimating server 130 executes (ii) the deriving process of the relation parameter, by using the log information on which the interpolation process is performed. More specifically, with respect to each of the one or more areas with a predetermined geographic range, a relation parameter representing a relation between the number of wireless terminals and a population is derived based on the number of wireless terminals existing in the area at a particular time (which may be referred to as reference time). Upon receiving information regarding a time and an area of population estimation from a user, the population estimating server 130 uses the relation parameter described above to execute (iii) the population estimating process in an arbitrary area. Accordingly, a population in an arbitrary area can be accurately estimated.

Each unit of the population estimating server 130 is summarized in FIG. 2, and details and operations thereof are described below. In the present embodiment, the population estimating server 130 includes a log information managing unit 212, a population information acquiring unit 214, an extracting unit 216, a parameter deriving unit 218, a population estimating unit 222, a storing unit 224, a communication controlling unit 226, and an input unit 228. The log information managing unit 212 may be one example of at least one of a log information acquiring unit, a classifying unit, and an interpolation information generating unit. The extracting unit 216 may be one example of at least one of a first terminal extracting unit, a second terminal extracting unit, a local area extracting unit, and a relation parameter extracting unit. The parameter deriving unit 218 may be one example of a relation parameter deriving unit. The storing unit 224 may be one example of a relation parameter storing unit.

The log information managing unit 212 manages the log information. In the present embodiment, the log information managing unit 212 acquires the log information collected by the information collecting server 120. The log information managing unit 212 stores the acquired log information in the storing unit 224. The log information managing unit 212 may analyze a plurality of pieces of log information associated with at least one communication terminal 110, and interpolates the log information. The log information managing unit 212 may analyze the acquired log information and generates a movement history of at least one communication terminal 110. Based on the movement history, the log information managing unit 212 may classify, the communication terminals 110 existing in a particular area at a particular time into communication terminals 110 that have transited through the area and communication terminals 110 that have stayed in the area.

Based on the movement history, the log information managing unit 212 may generate a probability of communication terminals that exist in a first area at a first time existing in a second area at a second time. Accordingly, an area having a high possibility from which a communication terminal existing in a particular area at a particular time is moved can be determined. Also, an area having a high possibility to which a communication terminal existing in a particular area at a particular time moves in the future can be determined.

In one embodiment, the log information managing unit 212 may include a existence probability generating unit to respectively generate, based on one or more pieces of movement history information, one or more pieces of existence probability information regarding a probability of a communication terminal that exists in a first area among one or more areas, each of which has a predetermined geographic range, existing in a second area among the one or more areas after one or more predetermined periods has respectively elapsed. The existence probability generating unit may generate one or more pieces of existence probability information for at least one of one or more segments related to time.

In the present embodiment, the population information acquiring unit 214 acquires local population information indicating a population of a local area with a predetermined geographic range. Also, the population information acquiring unit 214 acquires wide area population information indicating a population of a wide area including the local area. The population information acquiring unit 214 may acquire the local population information and the wide area population information input by a user from the input unit 228, or may acquire the local population information and the wide area population information stored in an external storage apparatus via the communication controlling unit 226.

It is sufficient if the local area is a division with a predetermined geographic range, for example, an administrative division, a division used in the case of conducting a national census, an area mesh, or the like. The local area may also be a particular facility. It is sufficient if the wide area is a geographic region including the one or more local areas such as a national territory, an administrative division, a division used in the case of conducting a national census, an area mesh, or the like, of each nation. The wide area may be a national territory of one or more nations, or may be a region including one or more administrative divisions.

Each of the local population information and the wide area population information may be information based on a survey result. Information based on a survey result is, for example, information indicated by a national census, a population movement survey, population estimation, statics on the immigration control, an estimation survey on the numbers of tourists and nights of their stay, a survey on regional movement of passengers, or the like, which are published by an administrative agency.

The information based on the survey result may also be information indicated by a traffic survey, an entry/exit record of a particular facility, a visitor record, a guest record, POS data, or the like. The traffic survey may be a survey on pedestrian traffic, traffic of light vehicles such as bicycles, traffic of vehicles such as motorcycles and automobiles, ship traffic, traffic of aircrafts or space ships, or combination thereof. The survey may be a survey using a sensor such as an infrared ray sensor, may be a survey using images taken by a camera and an image recognition program, or may be a survey taken by measuring staff to measure traffic and the like.

The local population information may include at least one of de jure population information indicating a de jure population in a local area, inflow population information indicating a population that has flowed inside a local area from outside the local area, and outflow population information indicating a population that have flowed from inside a local area to outside the local area. The wide area population information may include at least one of de jure population information indicating a de jure population in a wide area, inflow population information indicating a population that has flowed inside a wide area from outside the wide area, and outflow population information indicating a population that have flowed from inside a wide area to outside the wide area.

The de jure population information is, for example, an estimation value or a determined value based on a survey result value of a de jure population in a particular area at a predetermined time. The inflow population information is, for example, an estimation value or a determined value based on a survey result value of a population that has flowed inside a particular area from outside the particular area at a predetermined time. The outflow population information is, for example, an estimation value or a determined value based on a survey result value of a population that has flowed from inside a particular area to outside the particular area at a predetermined time.

The extracting unit 216 refers to the storing unit 224 and extracts information to match an extraction condition. In the present embodiment, the extracting unit 216 receives an extraction request including the extraction condition from the parameter deriving unit 218, the population estimating unit 222 and the like. Upon receiving the extraction request, the extracting unit 216 refers to the storing unit 224 and extracts information to match the extraction condition. The extracting unit 216 outputs the extracted information as a response to the extraction request.

The parameter deriving unit 218 derives a relation parameter to represent a relation between the number of communication terminals 110 and a population. In one embodiment, a relation parameter is determined for each local area. For example, the parameter deriving unit 218 derives, for each of the one or more local areas, a relation parameter based on the number of communication terminals 110 existing in the local area at reference time and a population of the local area indicated by local population information. Similarly, the parameter deriving unit 218 may also derive a relation parameter of a wide area.

In another embodiment, a relation parameter is determined for each communication terminal. In this case, the relation parameter may be a parameter to indicate a population represented by one communication terminal. For example, a parameter deriving unit 218 derives, for each of the one or more local areas, a relation parameter based on the number of communication terminals 110 existing in the local area at reference time and a population of the local area indicated by local population information. The parameter deriving unit 218 derives a relation parameter in each local area as a relation parameter applied to a communication terminal existing in the local area at the reference time.

The reference time is particular time in a day, or a particular period in a day. The particular period described above may be less than 24 hours. The particular period described above may be 20 hours or less, 12 hours or less, 10 hours or less, 9 hours or less, 8 hours or less, 6 hours or less, 4 hours or less, 3 hours or less, 2 hours or less, 1 hour or less, 30 minutes or less, or 15 minutes or less.

In one embodiment, reference time may be any time or period between 8:00 p.m. and 8:00 a.m. The reference time may be any time or period between 9:00 p.m. and 6:00 a.m., may be any time or period between 11:00 p.m. and 4:00 a.m., or may be any time or period between 0:00 a.m. and 3:00 a.m.

Compared with a population movement at daytime, a population movement at nighttime is considered that it shows a better correlation with population information such as a national census, a population movement survey, and population estimation, which are published by an administrative agency. Therefore, at any time or period between 8:00 p.m. and 8:00 a.m., it is possible to more accurately estimate a population by deriving a relation parameter of a particular area based on the number of communication terminals 110 existed in the particular area and the population information described above, and using the relation parameter to estimate population.

In another embodiment, reference time may also be any time or period during business hours or open hours of a particular facility. In this case, it is possible to more accurately estimate a population by deriving a relation parameter of a particular facility, using an entry/exit record, a visitor record, a guest record, POS data or the like of the particular facility for example.

In still another embodiment, reference time may be any time or period during actual operation hours of a population movement survey such as a traffic survey. In this case, it is possible to more accurately estimate a population by deriving a relation parameter in a target area of the traffic survey, using a result of the traffic survey for example.

The parameter deriving unit 218 may also respectively derive a relation parameter of one or more local areas for each predetermined time segment. The predetermined time segment may be at least one selected from a group consisting of 1 day, 1 week, 1 month, 3 months, 6 months, 1 year, weekdays, holidays, each day of the week, and each time period. The predetermined time segment may also be the same as or may also be different from an update cycle of a terminal ID. The predetermined time segment may also be shorter than the update cycle of the terminal ID. Accordingly, it is possible to accurately estimate population. Also, it can suppress a temporal fluctuation of an estimation result.

For example, if the parameter deriving unit 218 derives a relation parameter everyday, a population on Sep. 1, 2014 is estimated by using a relation parameter on Sep. 1, 2014, and a population on Sep. 2, 2014 is estimated by using a relation parameter on Sep. 2, 2014, for example. Therefore, for example, it is possible to accurately estimate population compared with a case in which population is estimated by using the same relation parameter throughout a month or a year. As a result, it can suppress a temporal fluctuation of an estimation result. Note that, in the example described above, an update cycle of a terminal ID may be one day, similar to the deriving cycle of the relation parameter. Also, the update cycle of the terminal ID and the deriving cycle of the relation parameter may be different from each other. The update cycle of the terminal ID may be longer than the deriving cycle of the relation parameter, for example, may be approximately from two days to one week.

The population estimating unit 222 estimates a population of an arbitrary area. The population estimating unit 222 may estimate a total population or may estimate an average population in an arbitrary area. In the present embodiment, the population estimating unit 222 receives input information indicating a geographic range and time of population estimation from the input unit 228. The population estimating unit 222 estimates a population at time and a geographic range indicated by the input information based on the number of communication terminals 110 at the time and the geographic range indicated by the input information and the relation parameter applied to the time and the geographic range indicated by the input information.

The population estimating unit 222 may estimate population movement in an arbitrary area in an arbitrary period. For example, the population estimating unit 222 estimates population movement in a particular area by calculating a population fluctuation state in the particular area in a particular period based on an estimation value of a population in the particular area.

The population estimating unit 222 may estimate a floating population in a particular area based on an estimation value of a population in the particular area. In one embodiment, a floating population is classified into a retaining population and a moving population. The population estimating unit 222 may estimate at least one of the retaining population and the moving population in an arbitrary area. In another embodiment, a floating population is classified into a staying population and a transiting population. The population estimating unit 222 may estimate at least one of the retaining population and the transiting population in an arbitrary area.

The storing unit 224 stores any type of information used for processing information in the parameter deriving unit 218, the population estimating unit 222 and the like. The storing unit 224 may also store information generated by processing information in the parameter deriving unit 218, the population estimating unit 222 and the like.

In the present embodiment, the communication controlling unit 226 controls communication among the population estimating server 130, the communication network 10, and at least one of the communication terminal 110 and the information collecting server 120. The communication controlling unit 226 may be a communication interface. The communication controlling unit 226 may correspond to a plurality of communication systems.

The input unit 228 receives an input from a user. In the present embodiment, the input unit 228 inputs input information indicating a geographic range and time of population estimation. The input unit 228 is, for example, a keyboard, a pointing device, a touch panel, a microphone or the like.

Figure 3:
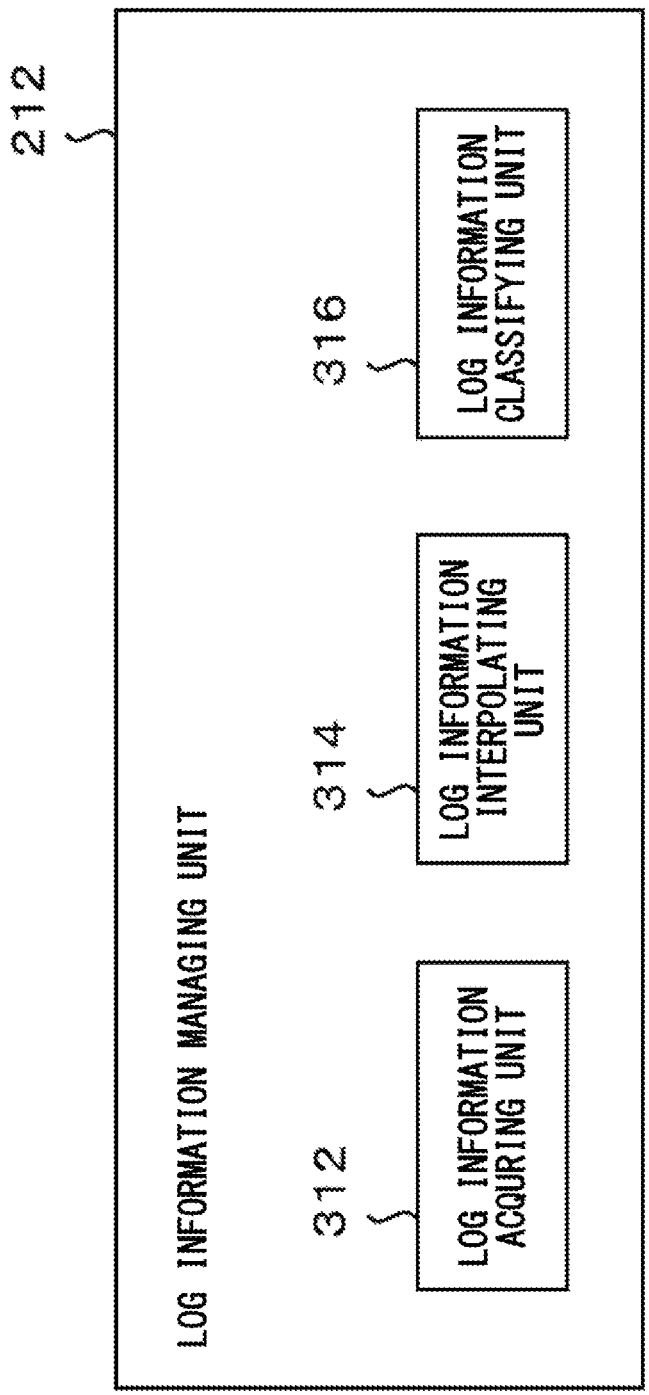
FIG. 3 schematically illustrates one example of a log information managing unit 212.

FIG. 3 schematically illustrates one example of a log information managing unit 212. In the present embodiment, the log information managing unit 212 includes a log information acquiring unit 312, a log information interpolating unit 314, and a terminal classifying unit 316. The log information interpolating unit 314 may be one example of an interpolation information generating unit. The terminal classifying unit 316 may be one example of a classifying unit.

The log information acquiring unit 312 acquires log information collected by an information collecting server 120. The log information acquiring unit 312 stores the acquired log information in a storing unit 224. Note that, the log information acquiring unit 312 may also acquire log information from a communication terminal 110, or a base station or an access point of the communication network 10.

The log information interpolating unit 314 generates information for interpolating log information. For example, the log information interpolating unit 314 first classifies a plurality of pieces of log information acquired from the information collecting server 120 as log information of each communication terminal 110. Also, the log information interpolating unit 314 rearranges the plurality of pieces of log information classified as log information of each communication terminal 110, based on time information of the log information. Next, for each pair of two pieces of temporally continuous log information, the log information interpolating unit 314 compares time information of the two pieces of log information. If a time interval between the time information indicated by the two pieces of log information is larger than a predetermined value, the log information interpolating unit 314 generates information for interpolating the two pieces of log information.

An interpolation method of the log information is not particularly limited. For example, if a distance between positions indicated by positional information of the two pieces of log information is smaller than a predetermined value, the log information interpolating unit 314 generates one or more pieces of log information including any one of the pieces of positional information of the two pieces of log information, and time information determined such that the log information is acquired at a predetermined time interval. The log information interpolating unit 314 may also generate one or more pieces of log information including any one of the pieces of positional information of the two pieces of log information, and time information indicating a predetermined time.

On the other hand, if a distance between positions indicated by the positional information of the two pieces of log information is larger than a predetermined value, the log information interpolating unit 314 generates one or more pieces of log information such that positions indicated by one or more pieces of log information generated by the interpolation process are arranged at a regular interval on a straight line connecting the positions indicated by the two pieces of log information described above, for example. In this case, the log information interpolating unit 314 may also calculate moving speed of the communication terminal 110 based on the two pieces of log information and generate the time information of the log information generated by the interpolation based on the moving speed of the communication terminal 110.

If at least one of the positions indicated by the positional information of the two pieces of log information is arranged on a road, on a rail, or on a route, the log information interpolating unit 314 may also generate one or more pieces of log information such that the position indicated by the log information generated by the interpolation is arranged on the road, on the rail or on the route. In one embodiment, a log information interpolating unit 314 first generates one or more pieces of log information such that positions indicated by one or more pieces of log information generated by an interpolation process is arranged at a regular interval on the straight line connecting the positions indicated by the two pieces of log information described above. Next, it respectively corrects one or more pieces of generated log information such that the positions indicated by the log information are arranged on the closest road, rail or route.

In another embodiment, a log information interpolating unit 314 first calculates moving speed of a communication terminal 110 based on time and positions indicated by two pieces of log information. Next, the log information interpolating unit 314 generates one or more pieces of log information such that the positions indicated by one or more pieces of log information generated by an interpolation process are arranged on the road, on the rail or on the route. In this case, the log information interpolating unit 314 may generate the log information such that the positions indicated by the one or more pieces of log information described above are distanced from one another at a regular interval. The log information interpolating unit 314 may also generate the log information such that time indicated by the one or more pieces of log information described above have a regular interval therebetween. The log information interpolating unit 314 may also calculate at least one of moving speed and a moving direction of the communication terminal 110 based on the two pieces of log information described above, or based on the two pieces of log information described above and pieces of log information before and after them, and generates the log information by using at least one of moving speed and the moving direction.

For example, the terminal classifying unit 316 analyzes the log information and classifies the communication terminals 110 into communication terminals 110 satisfying a particular condition and communication terminals 110 not satisfying the condition. The terminal classifying unit 316 may also analyze the log information and classifies the communication terminals 110 into communication terminals 110 satisfying a particular condition and communication terminals 110 not satisfying the condition. The terminal classifying unit 316 may acquire information regarding a communication terminal 110 existing in a geographic range indicated by input information input by the input unit 228 at time indicated by the input information from the extracting unit 216.

In one embodiment, a terminal classifying unit 316 classifies each communication terminal 110 existing in a geographic range indicated by the input information input by the input unit 228 at time indicated by the input information into communication terminals 110 that have stayed in the geographic range indicated by the input information and communication terminals 110 that have transited through the geographic range indicated by the input information. The communication terminals 110 that have stayed in the geographic range described above are used for the population estimating unit 222 estimating a staying population for example. The communication terminals 110 that have transited through the geographic range described above are used for the population estimating unit 222 estimating a transiting population for example.

Whether or not a particular communication terminal 110 stays in a geographic range indicated by input information is determined based on, for example: (a) a ratio of time at which the particular communication terminal 110 exists in the geographic range indicated by the input information to a period indicated by the input information; (b) the length of time at which the particular communication terminal 110 exists in the geographic range indicated by the input information in the period indicated by the input information; (c) positions of the communication terminal 110 at a start and end of a predetermined period including the time indicated by the input information; and (d) a combination thereof. Instead of the period indicated by the input information described above, a predetermined period including time indicated by the input information may be used.

For example, if a communication terminal 110 existing in a geographic range indicated by input information at time indicated by the input information exists at time at which a predetermined period has elapsed since time indicated by the input information in the geographic range, a terminal classifying unit 316 determines that the communication terminal 110 described above have stayed in the geographic range indicated by the input information. The time indicated by the input information may be a start of the time indicated by the input information. The time at which the predetermined period has elapsed since the time indicated by the input information may also be an end of the time indicated by the input information.

In another embodiment, a terminal classifying unit 316 classifies each communication terminal 110 existing in a geographic range indicated by input information input by an input unit 228 at time indicated by the input information into communication terminals 110 that have remained within the geographic range indicated by the input information and communication terminals 110 that have moved within the geographic range indicated by the input information. The communication terminals 110 that have remained within the geographic range described above are used for the population estimating unit 222 estimating a retaining population for example. The communication terminals 110 that have moved within the geographic range described above are used for the population estimating unit 222 estimating a moving population for example.

Whether or not a particular communication terminal 110 has remained within a geographic range indicated by input information is determined based on, for example: (a) an average value or the maximum value of moving speed of the communication terminal 110 in the geographic range and time indicated by the input information; (b) a moving distance of the communication terminal 110 in the geographic range and time indicated by the input information; (c) a variation of distance between a particular reference position and the terminal at time indicated by the input information; and (d) a combination thereof. Instead of the period indicated by the input information described above, a predetermined period including time indicated by the input information may also be used.

Figure 4:
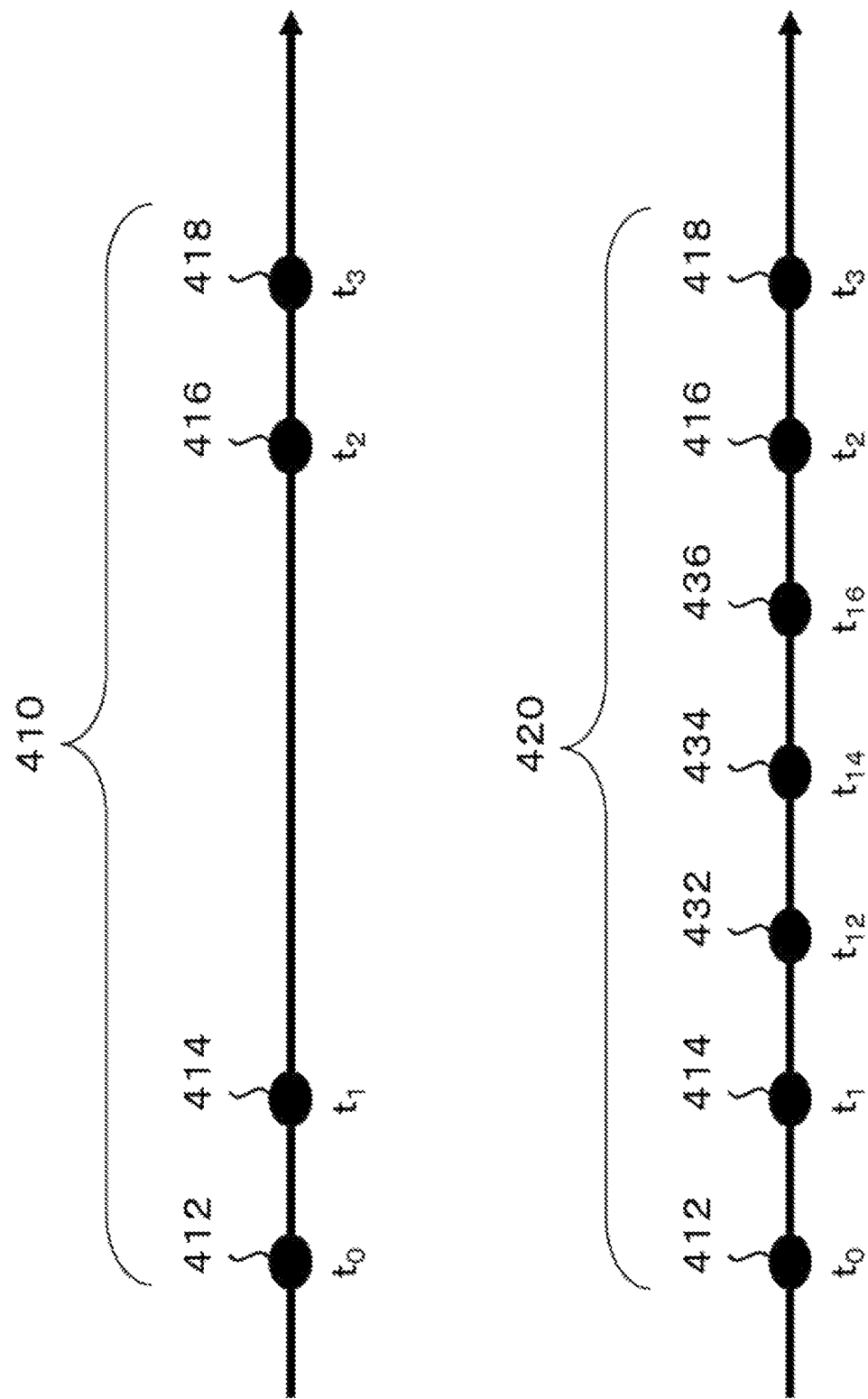
FIG. 4 schematically illustrates one example of an interpolation method of log information.

FIG. 4 schematically illustrates one example of an interpolation method in a log information interpolating unit 314. In the present embodiment, the log information 410 before an interpolation includes log information 412, log information 414, log information 416, and log information 418. For simplifying the description, one example of the interpolation method is described using an exemplary case in which a time between a time t0 and a time t1, and a time between a time t2 and a time t3 are five minutes, respectively, and a time between the time t1 and the time t2 is 20 minutes.

In the present embodiment, the log information interpolating unit 314 first determines, for each of the log information 412 and the log information 414, the log information 414 and the log information 416, and the log information 416 and the log information 418, whether or not an interval between time of the two pieces of log information is larger than five minutes. In the present embodiment, because an interval between time of the log information 414 and the log information 416 is larger than five minutes, the log information interpolating unit 314 determines to generate one or more pieces of log information for interpolating the log information 414 and the log information 416.

In the present embodiment, the log information interpolating unit 314 generates log information 432, log information 434 and log information 436. Time information of the log information 432, the log information 434, and the log information 436 is determined such that, the log information 432, the log information 434 and the log information 436 are arranged at a temporally regular interval, for example. Positional information of the log information 432, the log information 434, and the log information 436 is determined based on positions indicated by positional information of the log information 414 and the log information 416. The log information interpolating unit 314 stores interpolated log information 420 including the log information 432, the log information 434, and the log information 436 in a storing unit 224. Accordingly, population at an arbitrary time can be readily estimated.

Figure 5:
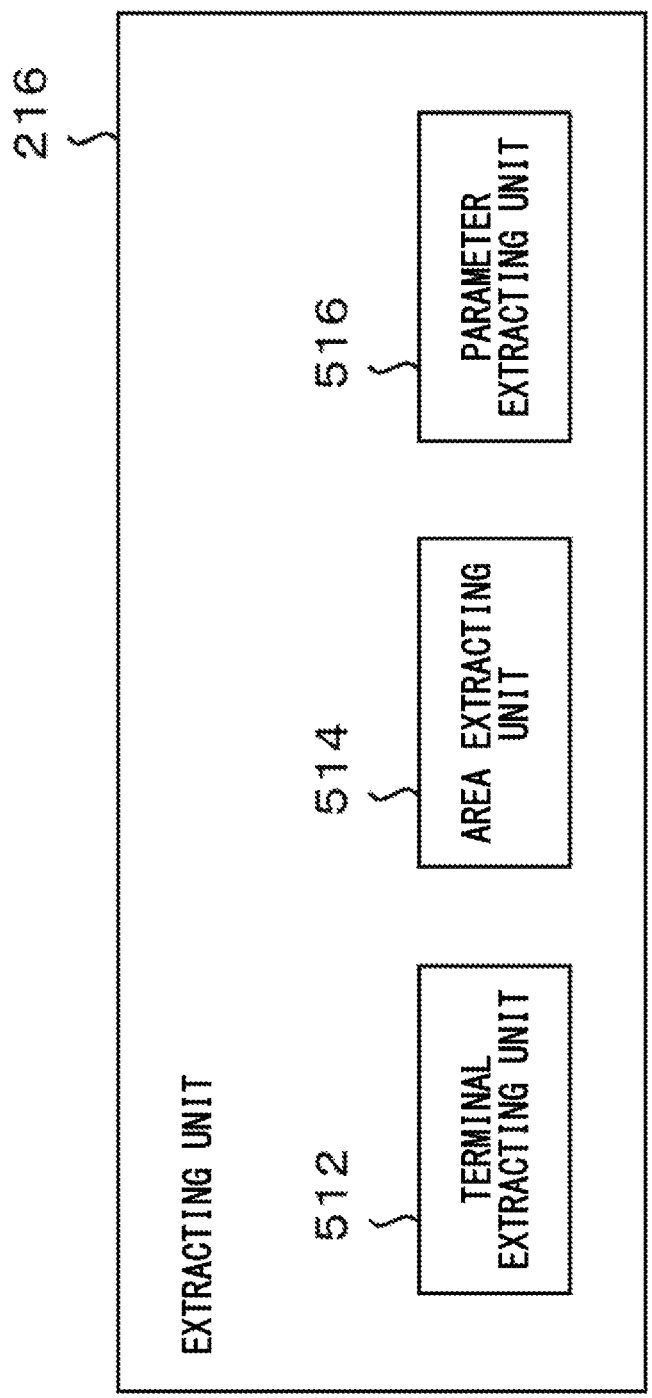
FIG. 5 schematically illustrates one example of an extracting unit 216.

FIG. 5 schematically illustrates one example of an extracting unit 216. In the present embodiment, the extracting unit 216 includes a terminal extracting unit 512, an area extracting unit 514, and a parameter extracting unit 516. The terminal extracting unit 512 may be one example of at least one of a first terminal extracting unit and a second terminal extracting unit. The area extracting unit 514 may be one example of a local area extracting unit. The parameter extracting unit 516 may be one example of a relation parameter extracting unit.

The terminal extracting unit 512 refers to a storing unit 224 and extracts communication terminals 110 to match an extraction condition. For example, the terminal extracting unit 512 extracts identification information of the communication terminals to match the condition. In one embodiment, in a deriving process of a relation parameter in a parameter deriving unit 218, a terminal extracting unit 512 receives an extraction request from the parameter deriving unit 218 and extracts communication terminals 110 existing in a particular area at reference time from among one or more communication terminals 110, based on one or more pieces of log information stored in a storing unit 224. In another embodiment, in a population estimating process in a population estimating unit 222, a terminal extracting unit 512 receives an extraction request from the population estimating unit 222 and extracts communication terminals 110 existing in a geographic range indicated by input information at time indicated by the input information from among one or more communication terminals 110, based on one or more pieces of log information stored in a storing unit 224.

The area extracting unit 514 refers to the storing unit 224 and extracts a local area or a wide area (the local area and the wide area may be collectively and simply referred to as an area) to match the extraction condition. For example, the area extracting unit 514 extracts identification information of the area to match the condition. In one embodiment, in a population estimating process in a population estimating unit 222, an area extracting unit 514 receives an extraction request from the population estimating unit 222, and extracts at least one local area included in a geographic range indicated by input information from among one or more local areas.

The parameter extracting unit 516 refers to the storing unit 224 and extracts relation parameters to match the extraction condition. In one embodiment, in a population estimating process in a population estimating unit 222, a parameter extracting unit 516 receives an extraction request from the population estimating unit 222 and extracts a relation parameter applied to a local area specified by the extraction request. For example, the parameter extracting unit 516 extracts a relation parameter applied to a local area extracted by the area extracting unit 514 from among one or more relation parameters. In this case, if a storing unit 224 respectively stores one or more relation parameters associated with a time segment to which the relation parameter applies, the parameter extracting unit 516 may extract the relation parameter applied to the local area extracted by the area extracting unit 514 at time indicated by the input information.

In another embodiment, in a population estimating process in a population estimating unit 222, a parameter extracting unit 516 receives an extraction request from the population estimating unit 222 and extracts a relation parameter applied to a communication terminal 110 specified by the extraction request. For example, the parameter extracting unit 516 extracts a relation parameter to respectively apply to one or more communication terminals 110 extracted by a terminal extracting unit 512 from among one or more relation parameters. The one or more communication terminals 110 described above may be a communication terminal existing in a geographic range indicated by input information at time indicated by the input information. In this case, if a storing unit 224 respectively stores one or more relation parameters associated with a time segment to which the relation parameter applies, the parameter extracting unit 516 may extract the relation parameter applied to each of the one or more communication terminals 110 extracted by the terminal extracting unit 512 at time indicated by the input information.

Figure 6:
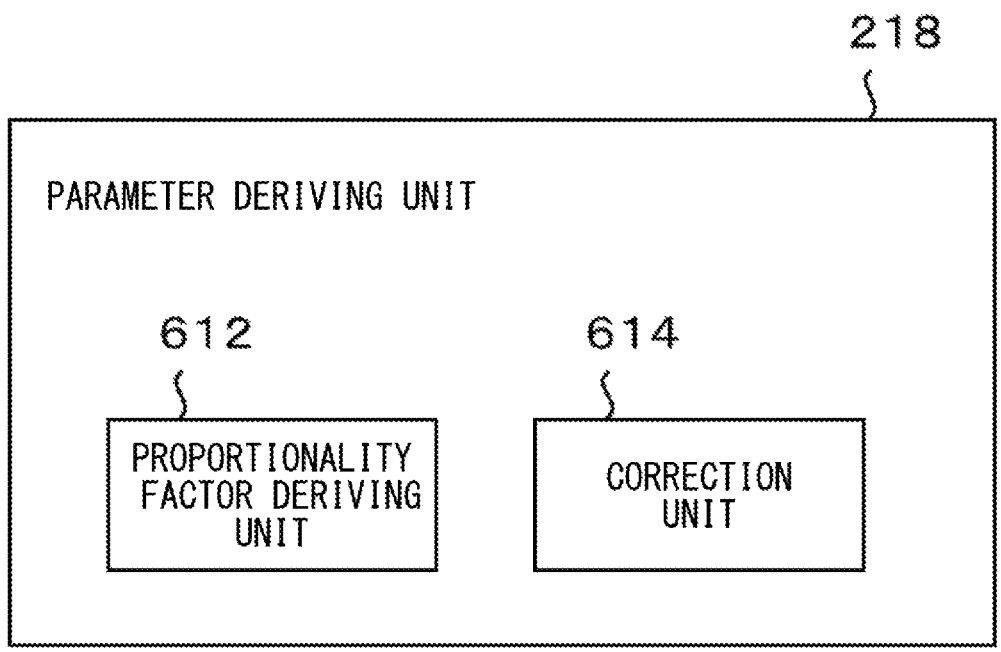
FIG. 6 schematically illustrates one example of a parameter deriving unit 218.

FIG. 6 schematically illustrates one example of a parameter deriving unit 218. In the present embodiment, the parameter deriving unit 218 includes a proportionality factor deriving unit 612 and a correction unit 614.

The proportionality factor deriving unit 612 calculates a proportionality constant indicating a ratio of the number of communication terminals 110 existing in the local area to a de jure population of the local area for each of one or more local areas. For example, a proportionality factor deriving unit 612 requests a terminal extracting unit 512 to extract communication terminals 110 existing in the local area at reference time for each of one or more local areas. The proportionality factor deriving unit 612 receives an extraction result from the terminal extracting unit 512. The proportionality factor deriving unit 612 derives the proportionality factor in each of the one or more local areas by dividing de jure population information for each of one or more local areas indicated by local population information acquired by the population information acquiring unit 214 by the number of communication terminals 110 extracted by the terminal extracting unit 512.

In the parameter deriving unit 218 of the present embodiment, a desired relation parameter is derived by the correction unit 614 correcting a proportionality factor derived by the proportionality factor deriving unit 612. For example, in the present embodiment, the correction unit 614 corrects the proportionality factor based on wide area population information and derives the relation parameter.

The proportionality factor derived by the proportionality factor deriving unit 612 is also one example of a relation parameter. However, population of each area can be more accurately derived by the parameter deriving unit 218 taking an inflow population, or an inflow population and an outflow population of each area into consideration and deriving a relation parameter. For example, if (a) a wide area population information is information based on a survey result, and (b) reference time is not included in operation hours of the survey, or if a period between the reference time and the operation hours of the survey is longer than a predetermined period, the population of each area can be more accurately derived by the parameter deriving unit 218 taking an inflow population and an outflow population into consideration and deriving a relation parameter.

For example, depending on local areas, it may be difficult to acquire information indicating an inflow population based on a survey result such as statics on immigration control, an estimation survey on the numbers of tourists and nights of their stay, and a survey on regional movement of passengers. In such a case, the population of each area can be more accurately derived by performing a correction process in which the inflow population is taken into consideration. Some examples of the correction process are described below. Note that, in the examples described below, correction in which the inflow population is taken into consideration is described. However, correction in which the inflow population and the outflow population are taken into consideration can also be performed in the similar procedure.

Note that, in another embodiment, the correction unit 614 may correct the number of communication terminals 110 existing in a particular local area.

The correction unit 614 may correct population in a particular local area. The population described above is, for example, de jure population, inflow population, outflow population, or the like. The population described above may be population indicated by local population information acquired by the population information acquiring unit 214.

According to one embodiment, a proportionality factor deriving unit 612 may derive a desired relation parameter by calculating the proportionality constant described above by using values of the number of communication terminals 110 or population corrected by a correction unit 614. According to another embodiment, a parameter deriving unit 218 may derive a desired relation parameter if (i) a proportionality factor deriving unit 612 calculates the proportionality constant described above by using values of the number of communication terminals 110 or population corrected by a correction unit 614, and (ii) the correction unit 614 further corrects the proportionality factor derived by the proportionality factor deriving unit 612.

First Embodiment of Correction Process

In one embodiment, a correction unit 614 derives relation parameters by multiplying proportionality factors of all local areas included in a wide area that successfully acquired information indicating an inflow population by the same correction factor. The correction factor described above is calculated by Equation (1) described below, for example.

(De Jure Population of Wide Area+Inflow Population of Wide Area)/(Resident Population of Wide Area) [Equation (1)]

Note that, a value that is adjusted based on a time segment in which the relation parameter is derived is used as the inflow population of the wide area. For example, if an inflow population of a wide area acquired by a population information acquiring unit 214 is an inflow population for one year, and if a time segment in which a relation parameter is derived is one week, a correction factor is calculated by using a value obtained by dividing the inflow population (people/year) of the wide area by 52 (weeks/year).

Second Embodiment of Correction Process

In another embodiment, a correction unit 614 derives a relation parameter by multiplying a proportionality factor of each local area by a correction factor corresponding to a magnitude of a proportionality factor of the local area. The larger the proportionality factor of the local area is, the larger the correction factor may be determined. Also, the larger the proportionality factor of the local area is, the smaller the correction factor may be determined.

Third Embodiment of Correction Process

In another embodiment, a correction unit 614 derives a relation parameter by multiplying a proportionality factor of each local area by a correction factor corresponding to a magnitude of a de jure population of the local area. The larger the de jure population of the local area is, the larger the correction factor may be determined.

Fourth Embodiment of Correction Process

In another embodiment, a correction unit 614 derives a relation parameter of a local area that successfully acquired information indicating an inflow population by multiplying a proportionality factor of the local area by a correction factor of the local area indicated by: (De Jure Population+Inflow Population)/(Resident Population). On the other hand, for remaining local areas included in the same wide area as the local area that successfully acquired the information indicating the inflow population, relation parameters are derived in the manner similar to the cases of the first to the third embodiments described above, using a value obtained by subtracting the inflow population of the local area that successfully acquired the information indicating the inflow population from the inflow population of the wide area as an inflow population of the remaining local areas.

The correction unit 614 may execute a correction process of a fourth embodiment by dividing one local area into a plurality of areas. For example, even if it is difficult to acquire information indicating an inflow population based on a survey result in a particular local area, information indicating the inflow population may be acquired based on a survey result in one or more facilities included in the particular local area. Also, influence on population movement of surrounding areas, which results from a particular facility in a particular local area opening or closing its business may be simulated. In such a case, the particular local area described above may be divided into a region corresponding to the particular facility described above and the remaining regions to execute the correction process.

Fifth Embodiment of Correction Process

In another embodiment, a correction unit 614 corrects the number of communication terminals 110 existing in a particular local area. According to the present embodiment, if calculating for each of one or more local areas a proportionality constant indicating a ratio between the number of communication terminals 110 existing in the local areas and de jure population in the local areas, a proportionality factor deriving unit 612 calculates a proportionality constant by using a value corrected by the correction unit 614 as the number of communication terminals 110 existing in the local area described above.

In recent years, a single user often carries a plurality of mobile terminals. Therefore, in the present embodiment, the correction unit 614 takes the number of a plurality of communication terminals 110, which are highly likely to be carried by the same user among communication terminals 110 extracted by a terminal extracting unit 512 into consideration, and corrects the number of communication terminals 110 existing in the local area. For example, the correction unit 614 calculates a correction value of the number of communication terminals 110 existing in a particular local area by treating a plurality of communication terminals that are highly likely to be carried by the same user as one communication terminal.

In the present embodiment, the correction unit 614 determines whether or not a plurality of communication terminals are carried by the same user based on a similarity in movement history of the plurality of communication terminals. For example, if a similarity in movement history of a plurality of communication terminals is larger than a predetermined value, a correction unit 614 determines that the plurality of communication terminals is carried by the same users. If a similarity in movement history of a plurality of communication terminals is smaller than a predetermined value, the correction unit 614 may determine that the plurality of communication terminals is carried by different users.

If going on a trip or a business trip with family members, friends, or acquaintances, it is possible that a similarity of movement history of a plurality of communication terminals carried by different users is larger than the predetermined value described above. Therefore, if a statistical value of the similarity in the movement history calculated in each of a plurality of days is larger than a predetermined value, the correction unit 614 may determine that the plurality of communication terminals are carried by the same user. A statistical value of a similarity of movement history calculated in each of the plurality of days can be, for example, an average value of each similarity calculated for arbitrary number of days in a valid period of the terminal identification information of the communication terminals, or the like.

Sixth Embodiment of Correction Process

Described in the fifth embodiment described above is an embodiment to correct the number of communication terminals 110 existing in a local area, if a plurality of mobile terminals are highly likely to be carried by a single user. On the other hand, according to the present embodiment, if a plurality of mobile terminals are highly likely to be carried by a single user, a correction unit 614 derives a relation parameter by multiplying a proportionality factor of each local area by a correction factor in which the number of a plurality of communication terminals 110 highly likely to be carried by the same user is taken into consideration.

For example, as described below, in the third embodiment of the population estimating process, a relation parameter applied to each communication terminal is derived based on a position of each communication terminal at reference time. The correction unit 614 takes the number of a plurality of communication terminals 110, which are highly likely to be carried by the same user among communication terminals 110 extracted by the terminal extracting unit 512 into consideration, and corrects the value of the relation parameter applied to each communication terminal. For example, if a communication terminal A and a communication terminal B are highly likely to be carried by the same user, the correction unit 614 corrects a relation parameter applied to the communication terminal A and the communication terminal B by multiplying values of relation parameters to apply to the communication terminal A and the communication terminal B, which are calculated by a proportionality factor deriving unit 612, by ½.

Seventh Embodiment of Correction Process

In another embodiment, a correction unit 614 corrects population information in a particular local area. For example, if a campus of a university, an office of a large enterprise, or the like is moved from a particular local area to another local area, relatively large population change is observed in relatively short period. However, a survey period is decided for an actual population survey such as the national census, thus it is possible that the population change described above is not reflected in a survey result value over relatively long period.

Therefore, in the present embodiment, a correction unit 614 detects abrupt population change by monitoring log information acquired by a log information acquiring unit 312. For example, the correction unit 614 monitors a variation amount or variation rate of the number of communication terminals in a predetermined period for each of a plurality of local areas. The correction unit 614 may detect abrupt population change if a variation amount or coefficient of variation of the number of communication terminals is larger than a predetermined value. The predetermined period may be 1 month, 2 months, 3 months, or 6 months.

More specifically, the correction unit 614 requests a terminal extracting unit 512 to extract communication terminals 110 existing in each of one or more local areas at reference time at regular timing or arbitrary timing. The correction unit 614 receives an extraction result from the terminal extracting unit 512. The correction unit 614 compares the number of communication terminals 110 at starting time in the predetermined period described above with the number of communication terminals 110 at each timing, and calculates a variation amount or variation rate of the number of communication terminals in each local area.

If (i) increase in the number of communication terminals in a particular local area and decrease of the number of communication terminals in another local area contemporaneously happen, and (ii) a scale of the increase and decrease in the number of communication terminals described above is similar, the correction unit 614 determines that a particular group of people have moved from a particular local area to the other local area, and determines to correct population information of the particular local area described above and the other local area. If a starting period or a peak period of an increase of the number of communication terminals in a particular local area and a starting period or a peak period of a decrease in the number of communication terminals in another local area are in a predetermined period, the correction unit 614 may determine that the increase in the number of communication terminals in the particular local area and the decrease in the number of communication terminals in the other local area have happened contemporaneously. If difference of an increased amount and a decreased amount of the number of communication terminals is smaller than a predetermined value, the correction unit 614 may determine that the scale of the increase and decrease in the number of communication terminals described above is similar.

In one embodiment, a correction unit 614 may correct population information of a particular local area by subtracting "a value obtained by multiplying a value of a relation parameter at starting time of the predetermined period described above by the number of communication terminals increased during the predetermined period described above" from "a value of population of a particular local area acquired by a population information acquiring unit 214." Similarly, the correction unit 614 may correct population information of another local area. Before actually executing the correction process, the correction unit 614 may inquire of a supervisor or operator of a population estimating server 130 whether or not to execute the correction process, and execute the correction process based on an instruction of the supervisor or the operator described above. Based on a news report and the like, the supervisor or the operator may investigate the fact associated with the population change described above and determine whether or not to execute the correction process. Note that, based on a news report, database, and the like, the correction unit 614 may investigate the fact associated with the population change described above and determine whether or not to execute the correction process.

In another embodiment, if a correction unit 614 determines that a particular group of people has moved from a particular local area to another local area, it may replace values of a relation parameter of the particular local area and the other local area with a value of a relation parameter in a wide area including the particular local area and the other local area. The correction unit 614 may temporarily correct population information in the particular local area until a population information acquiring unit 214 acquires new population information regarding the particular local area and the other local area. If the population estimating unit 222 estimates population based on the corrected population information, it may show information indicating the fact to a user.

In the present embodiment, a process of the correction unit 614 is described using an exemplary case in which a particular local area and another local area have one-to-one correspondence between them. However, the correction unit 614 is not limited to the present embodiment. In another embodiment, even if a particular local area and another local area have one-to-many or many-to-one correspondence between them, a correction unit 614 may execute a correction process similar to the present embodiment.

Figure 7:
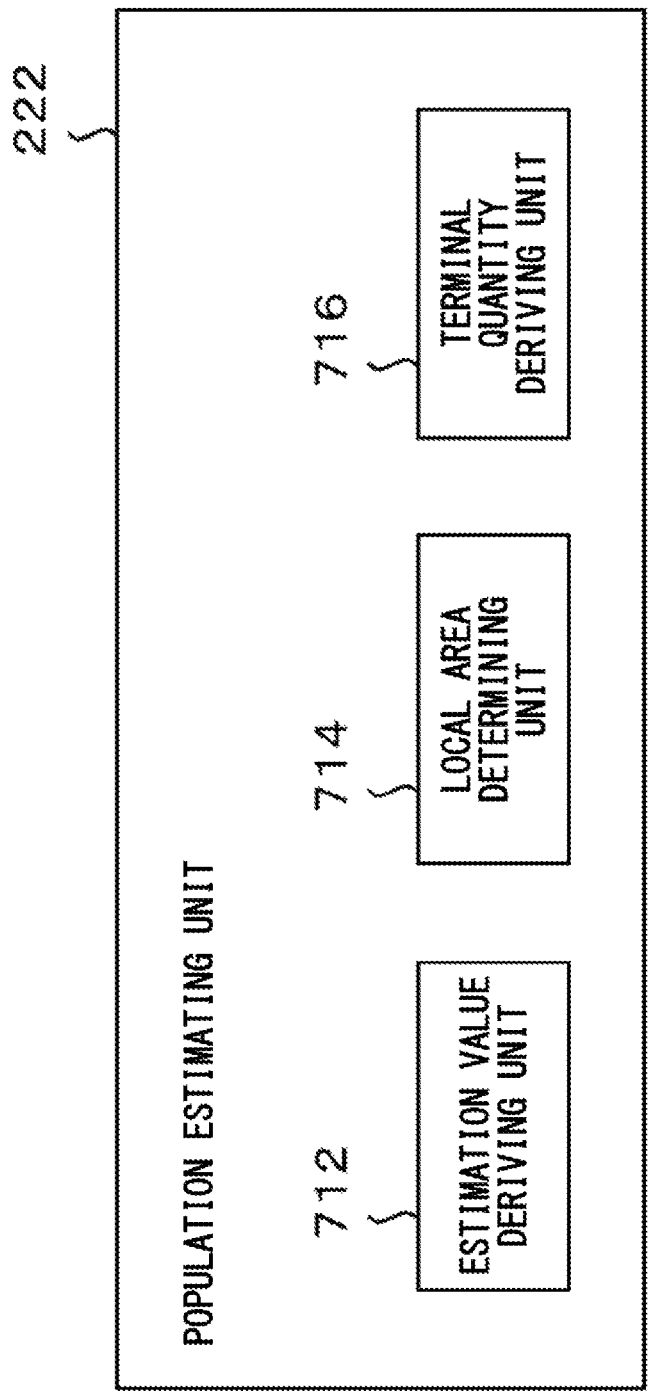
FIG. 7 schematically illustrates one example of a population estimating unit 222.

FIG. 7 schematically illustrates one example of a population estimating unit 222. In the present embodiment, the population estimating unit 222 includes an estimation value deriving unit 712, an area determining unit 714, and a terminal quantity deriving unit 716. The area determining unit 714 may be one example of a local area determining unit.

The estimation value deriving unit 712 derives an estimation value of a population from the number of communication terminals 110 by using a relation parameter derived by a parameter deriving unit 218. In the present embodiment, the estimation value deriving unit 712 requests a terminal extracting unit 512 to extract communication terminals 110 existing in a geographic range indicated by input information at time indicated by the input information. The estimation value deriving unit 712 receives an extraction result from the terminal extracting unit 512.

The estimation value deriving unit 712 requests the area extracting unit 514 to extract local areas included in the geographic range indicated by the input information. The estimation value deriving unit 712 receives an extraction result from the area extracting unit 514.

The estimation value deriving unit 712 determines the number of communication terminals 110 existing in the geographic range indicated by the input information at time indicated by the input information, based on the extraction result received from the area extracting unit 514. The estimation value deriving unit 712 determines a proper relation parameter corresponding to the area based on the extraction result received from the area extracting unit 514. The estimation value deriving unit 712 estimates a population of the geographic range indicated by the input information at time indicated by the input information by multiplying the number of communication terminals 110 existing in the geographic range indicated by the input information at time indicated by the input information by the proper relation parameter corresponding to the area.

In one embodiment, if a population estimating unit 222 derives an estimation value of a total population, an estimation value deriving unit 712 uses the number of communication terminals 110 extracted by a terminal extracting unit 512 as the number of communication terminals 110 existing in a geographic range indicated by input information at time indicated by the input information. In another embodiment, if a population estimating unit 222 derives an estimation value of an average population, an estimation value deriving unit 712 may take a weight factor of each communication terminal 110 extracted by a terminal extracting unit 512 into consideration and calculate the number of communication terminals 110 existing in a geographic range indicated by input information at time indicated by the input information.

Based on the log information, the area determining unit 714 determines a local area in which at least one wireless terminal extracted by the terminal extracting unit 512 existed in the most recent reference time from among one or more local areas. The terminal quantity deriving unit 716 derives the number of communication terminals 110 existed in the most recent reference time for each of the at least one local area determined by the area determining unit 714.

First Embodiment of Population Estimating Process

According to one embodiment of a population estimating process in a population estimating unit 222, an estimation value deriving unit 712 requests a parameter extracting unit 516 to extract a relation parameter applied to a local area extracted by an area extracting unit 514. The estimation value deriving unit 712 may also request the parameter extracting unit 516 to extract the relation parameter applied to the local area extracted by the area extracting unit 514 at time indicated by the input information. The estimation value deriving unit 712 receives an extraction result from the parameter extracting unit 516.

According to the present embodiment, the estimation value deriving unit 712 derives an estimation value of a population of the geographic range indicated by the input information at time indicated by the input information based on the number of communication terminals 110 extracted by the terminal extracting unit 512 and the relation parameter extracted by the parameter extracting unit 516. Specifically, the estimation value deriving unit 712 first calculates, for each of the local areas included in the geographic range indicated by the input information, the estimation value of a population of each of the local areas by multiplying the number of communication terminals 110 in the local area extracted by the terminal extracting unit 512 by the relation parameter of the local area extracted by the parameter extracting unit 516. Next, the estimation value deriving unit 712 counts up the estimation values of the population of each local area to derive an estimation value of a population of the geographic range indicated by the input information at time indicated by the input information.

The process in a first embodiment is described using an exemplary case in which a population at 3:00 p.m. on Sep. 1, 2014 is estimated in a case in which an area A, area B, and area C are included in a geographic range indicated by input information. Note that, in this case, reference time is 3:00 a.m. and a parameter deriving unit 218 derives a relation parameter everyday. A population estimating process and a deriving process of the relation parameter may be executed at arbitrary time and date. The population estimating process and the deriving process of the relation parameter may be executed at different time and date, or may be executed simultaneously or serially.

First, the parameter deriving unit 218 derives a relation parameter of Sep. 1, 2014 in each area based on positions at which communication terminals existed at 3:00 a.m. on Sep. 1, 2014. The parameter deriving unit 218 stores the derived relation parameter in a storing unit 224. Next, an area extracting unit 514 extracts the area A, area B, and area C as areas included in the geographic range indicated by the input information.

Note that, the deriving process of the relation parameter in the parameter deriving unit 218 may be executed after the extracting process of the areas by the area extracting unit 514. In this case, the parameter deriving unit 218 may not derive the relation parameters of the areas other than the area A, area B, and area C.

Next, a parameter extracting unit 516 refers to the storing unit 224 and extracts the relation parameter of Sep. 1, 2014 for each of the area A, area B, and area C. Also, the terminal extracting unit 512 refers to the storing unit 224 and extracts the number of communication terminals 110 existed at 3:00 p.m. on Sep. 1, 2014 in each of the area A, area B, and area C.

Next, an estimation value deriving unit 712 calculates, for each of the area A, area B, and area C, an estimation value of a population in each area by multiplying "the number of communication terminals 110 existed in each area at 3:00 p.m. on Sep. 1, 2014" by "the relation parameter of Sep. 1, 2014 in each area."

Then, the estimation value deriving unit 712 sums up the estimation values of the population of each area to derive an estimation value of a population of the geographic range indicated by the input information at time indicated by the input information.

Second Embodiment of Population Estimating Process

According to another embodiment of a population estimating process in the population estimating unit 222, it is different from the first embodiment in that population is estimated using a relation parameter associated with "local areas in which communication terminals that exist in a target area of the population estimating process at target time of the population estimating process existed at reference time" (which may be referred to as a local area in the reference time). According to the present embodiment, an estimation value deriving unit 712 first requests a terminal extracting unit 512 to extract one or more communication terminals 110 existing in a local area extracted by an area extracting unit 514. The estimation value deriving unit 712 receives an extraction result from the terminal extracting unit 512. Next, the estimation value deriving unit 712 requests an area determining unit 714 to determine a local area in which each of the communication terminals 110 extracted by the terminal extracting unit 512 existed in the most recent reference time. The estimation value deriving unit 712 receives a determination result from the area determining unit 714.

Next, the estimation value deriving unit 712 requests the parameter extracting unit 516 to extract a relation parameter applied to each local area (the local areas at the reference time) determined by the area determining unit 714. The estimation value deriving unit 712 may also request the parameter extracting unit 516 to extract the relation parameter applied to the local area determined by the area determining unit 714 at time indicated by the input information. The estimation value deriving unit 712 receives an extraction result from the parameter extracting unit 516.

According to the present embodiment, the estimation value deriving unit 712 estimates population in the procedure described below. The estimation value deriving unit 712 first calculates an estimation value of a population of each local area at the reference time by multiplying, for each local area determined by the area determining unit 714, the number of communication terminals 110 in the local area derived by the terminal quantity deriving unit 716 by the relation parameter of the local area extracted by the parameter extracting unit 516. Next, it counts up the estimation values of the population of each local area described above to derive an estimation value of a population of the geographic range indicated by the input information at time indicated by the input information.

The process in a second embodiment is described using an exemplary case in which a geographic range indicated by input information is an area X and a population at 3:00 p.m. on Sep. 1, 2014 is estimated. Note that, in this case, reference time is 3:00 a.m. and a parameter deriving unit 218 derives a relation parameter everyday. A population estimating process and a deriving process of the relation parameter may be executed at arbitrary time and date. The population estimating process and the deriving process of the relation parameter may be executed at different time and date, or may be executed simultaneously or serially.

First, the parameter deriving unit 218 derives a relation parameter of Sep. 1, 2014 in each area based on positions at which communication terminals existed at 3:00 a.m. on Sep. 1, 2014. The parameter deriving unit 218 stores the derived relation parameter in a storing unit 224.

Next, an area extracting unit 514 extracts the area X as an area included in the geographic range indicated by the input information. Also, the terminal extracting unit 512 refers to the storing unit 224 and extracts the communication terminals 110 existed at 3:00 p.m. on Sep. 1, 2014 in an area of the area X.

Next, an area determining unit 714 determines the local area in which the communication terminal existed at 3:00 a.m. on Sep. 1, 2014 for each of the communication terminals 110 extracted by the terminal extracting unit 512. For example, the area determining unit 714 determines that 50 communication terminals 110 existed in the area of the area X at 3:00 p.m. on Sep. 1, 2014, among which 10 communication terminals 110 existed in an area A at 3:00 a.m. on Sep. 1, 2014, among which 25 communication terminals 110 existed in an area B at 3:00 a.m. on Sep. 1, 2014, and among which 15 communication terminals 110 existed in an area C at 3:00 a.m. on Sep. 1, 2014.

Note that, the deriving process of the relation parameter in the parameter deriving unit 218 may be executed after the determination process of areas by the area determining unit 714. In this case, the parameter deriving unit 218 may not derive the relation parameters of the areas other than the area A, area B, and area C.

Next, a parameter extracting unit 516 refers to the storing unit 224 and extracts the relation parameter of Sep. 1, 2014 for each of the area A, area B, and area C. Next, the estimation value deriving unit 712 calculates an estimation value of a population that have moved from the area A to the area X, by multiplying "the number of communication terminals 110 existed in the area of the area A at 3:00 a.m. on Sep. 1, 2014 among the communication terminals 110 existed in the area of the area X at 3:00 p.m. on Sep. 1, 2014" by "the relation parameter of the area A on Sep. 1, 2014."

The estimation value deriving unit 712 calculates an estimation value of a population that has moved from the area B to the area X, and an estimation value of a population that has moved from the area C to the area X, in the similar procedure. Then, the estimation value deriving unit 712 sums up the estimation values of the population that has moved from each area to the area X to derive an estimation value of a population of the geographic range indicated by the input information at time indicated by the input information.

Third Embodiment of Population Estimating Process

According to another embodiment of the population estimating process of the population estimating unit 222, a relation parameter applied to each communication terminal is derived in advance based on a position of each communication terminal at reference time. The relation parameter may be a parameter to indicate a population represented by each communication terminal. For example, if a relation parameter associated with a particular communication terminal is 5 [persons/terminals], population is estimated such that a population of 5 people moves accompanied with movement of the communication terminal. According to the present embodiment, it is different from the second embodiment in that the population estimating unit 222 estimates population using a relation parameter associated with each communication terminal. Accordingly, compared with the second embodiment, it is possible to drastically decrease calculation amount.

According to the present embodiment, an estimation value deriving unit 712 first requests a terminal extracting unit 512 to extract one or more communication terminals 110 existing in a local area extracted by an area extracting unit 514. The estimation value deriving unit 712 receives an extraction result from the terminal extracting unit 512. Next, the estimation value deriving unit 712 requests the parameter extracting unit 516 to extract the relation parameter applied to each of the one or more communication terminals 110 extracted by the terminal extracting unit 512. The estimation value deriving unit 712 may also request the parameter extracting unit 516 to extract a relation parameter applied to each of the one or more communication terminals 110 extracted by terminal extracting unit 512 at time indicated by the input information. The estimation value deriving unit 712 receives an extraction result from the parameter extracting unit 516.

According to the present embodiment, the estimation value deriving unit 712 calculates an estimation value of a population by summing up values of relation parameters to apply to each of the one or more communication terminals 110 extracted by the terminal extracting unit 512. Note that, a method for calculating an estimation value of a population using a relation parameter of each communication terminal is not limited to the present embodiment.

The process in a third embodiment is described using an exemplary case in which a geographic range indicated by input information is an area X and a population at 3:00 p.m. on Sep. 1, 2014 is estimated. Note that, in this case, reference time is 3:00 a.m. and a parameter deriving unit 218 derives a relation parameter everyday. A population estimating process and a deriving process of the relation parameter may be executed at arbitrary time and date. The population estimating process and the deriving process of the relation parameter may be executed at different time and date, or may be executed simultaneously or serially.

First, the parameter deriving unit 218 derives a relation parameter of Sep. 1, 2014 in each area based on positions at which communication terminals exist at 3:00 a.m. on Sep. 1, 2014. The parameter deriving unit 218 stores in a storing unit 224 the relation parameter of Sep. 1, 2014 in each area as a relation parameter applied to communication terminals existing in the area at 3:00 a.m. on Sep. 1, 2014. For example, the storing unit 224 associates terminal identification information of a communication terminal with a relation parameter of Sep. 1, 2014 in an area in which the communication terminal existed at 3:00 a.m. on Sep. 1, 2014, and stores the associated item. The storing unit 224 may also store a relation parameter of Sep. 1, 2014 of each area and terminal identification information of a communication terminal existed in an area of each area at 3:00 a.m. on Sep. 1, 2014, such that they are associated with each other.

Next, an area extracting unit 514 extracts the area X as an area included in the geographic range indicated by the input information. Also, the terminal extracting unit 512 refers to the storing unit 224 and extracts the communication terminals 110 existed at 3:00 p.m. on Sep. 1, 2014 in an area of the area X. Next, the parameter extracting unit 516 refers to the storing unit 224 and extracts a relation parameter of Sep. 1, 2014 associated with each of the communication terminals 110 existed in the area of the area X at 3:00 p.m. on Sep. 1, 2014. Next, by summing up values of one or more relation parameters extracted by the parameter extracting unit 516, the estimation value deriving unit 712 derives an estimation value of a population of the geographic range indicated by the input information at time indicated by the input information.

Using FIG. 8 and FIG. 9, one example of the process in the area determining unit 714 and the terminal quantity deriving unit 716 in the second embodiment of the population estimating process is described, using an exemplary case of deriving an estimation value of a population of X city at 3:00 p.m. on Sep. 1, 2014. FIG. 8 schematically illustrates one example of a processing result in the area determining unit 714. FIG. 9 schematically illustrates one example of a processing result in the terminal quantity deriving unit 716.

In the present embodiment, first, the terminal extracting unit 512 refers to one or more pieces of log information stored in a storing unit 224 and extracts communication terminals 110 existing in X city at 3:00 p.m. on Sep. 1, 2014. The area determining unit 714 receives terminal IDs of the extracted communication terminals 110 from the terminal extracting unit 512 and inputs them in a column of terminal IDs 812 in a data table 800. Next, the area determining unit 714 refers to one or more pieces of log information stored in the storing unit 224 and determines, for each of the communication terminals 110 extracted by the terminal extracting unit 512, an area in which the communication terminal existed at 3:00 a.m. on Sep. 1, 2014. The area determining unit 714 inputs area IDs of the determined areas in a column of area IDs 814 in the data table 800. Accordingly, the data table 800 is generated which stores the terminal IDs 812 of the terminals existing in X city at 3:00 p.m. on Sep. 1, 2014 and the area IDs 814 of areas in which each terminal existed at 3:00 a.m. on Sep. 1, 2014, such that they are associated with each other.

On the other hand, a terminal quantity deriving unit 716 receives the data table 800 from the area determining unit 714. The terminal quantity deriving unit 716 counts up the data table 800 to generate a data table 900 to store area IDs 912 of areas in which each terminal existed at 3:00 a.m. on Sep. 1, 2014 and the number of terminal IDs 914 of each area such that they are associated with each other. Accordingly, the estimation value deriving unit 712 can readily calculate an estimation value of a population of each local area by multiplying the number of terminal IDs 914 by the relation parameter applied to the area indicated by the area ID 912.

Figure 10:
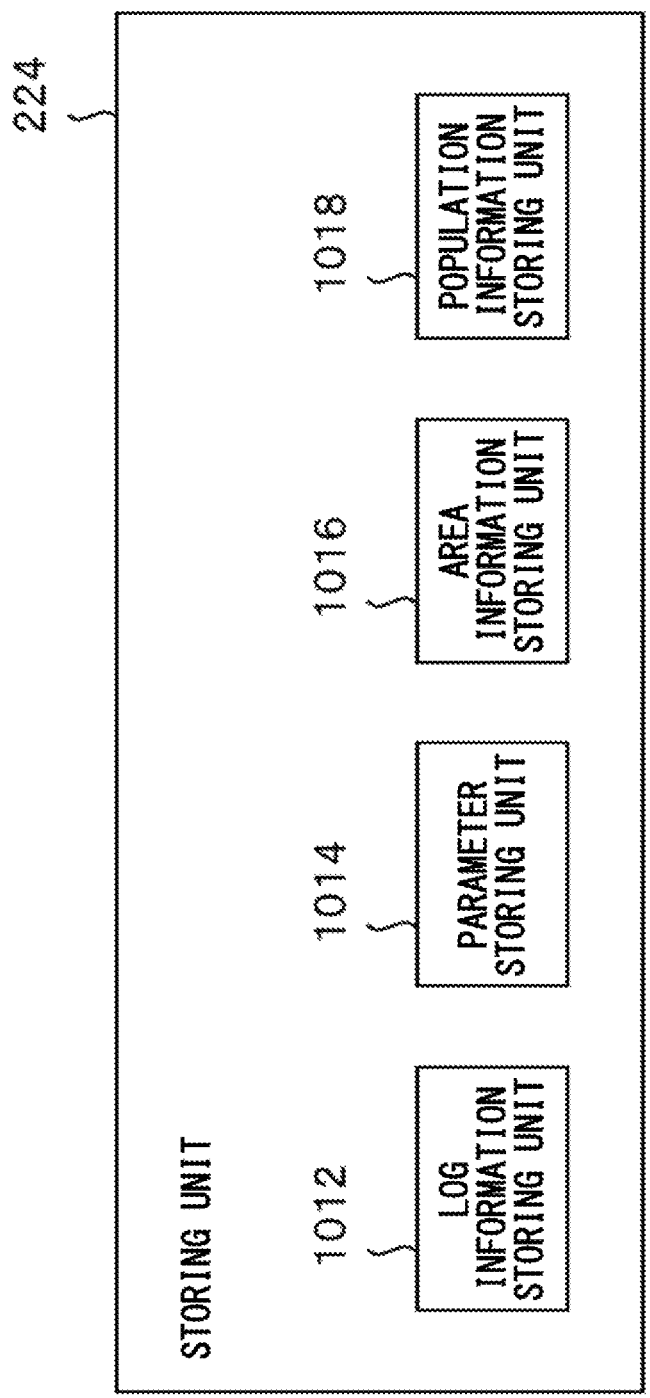
FIG. 10 schematically illustrates one example of a storing unit 224.

FIG. 10 schematically illustrates one example of a storing unit 224. In the present embodiment, a storing unit 224 includes a log information storing unit 1012, a parameter storing unit 1014, an area information storing unit 1016, and a population information storing unit 1018. The log information storing unit 1012 stores log information acquired by a log information managing unit 212. The parameter storing unit 1014 stores a relation parameter derived by a parameter deriving unit 218. The parameter storing unit 1014 may respectively store one or more relation parameters derived by the parameter deriving unit 218 and at least one of terminal identification information of a communication terminal 110, identification information of a local area, and a time segment to which the relation parameter is applied, such that they are associated with each other. The area information storing unit 1016 stores area information regarding a local area and a wide area. The population information storing unit 1018 stores the population information acquired by the population information acquiring unit 214.

FIG. 11 schematically illustrates one example of a data table 1100. The data table 1100 may be one example of log information stored in a log information storing unit 1012. In the present embodiment, the data table 1100 stores a terminal ID 1112, positional information 1114 indicating a position of a communication terminal 110 identified by the terminal ID 1112, and time information 1116 indicating time at which the positional information 1114 is acquired, such that they are associated with one another. The terminal ID 1112 may be one example of terminal identification information.

FIG. 12 schematically shows one example of a data table 1200. The data table 1200 is used to manage a terminal ID if the terminal ID is updated, for example, in each predetermined period. For example, the data table 1200 is stored in a log information storing unit 1012 with a data table 1100. In the present embodiment, the data table 1200 stores a valid period 1214 of the terminal ID, a terminal ID 1216 in the valid period, and a terminal ID 1212 for the total period, such that they are associated with one another. The terminal ID 1212 may be identification information for uniquely identifying a terminal ID throughout a plurality of valid periods or all valid periods. Accordingly, it is possible to precisely estimate population even if the terminal ID 1216 is reused.

FIG. 13 schematically shows one example of a data table 1300. The data table 1300 may be one example of parameter information stored in a parameter storing unit 1014. In the present embodiment, the data table 1300 respectively stores one or more relation parameters and at least one of time segments to which the relation parameter is applied and a geographic range to which the relation parameter is applied, such that they are associated with each other. In the present embodiment, the data table 1300 stores a parameter ID 1312 to respectively identify one or more relation parameters, an area ID 1314 of an area to which the relation parameter identified by the parameter ID 1312 is applied, a time segment 1316 to which the relation parameter identified by the parameter ID 1312 is applied, a relation parameter 1322 before a correction process is performed by the correction unit 614, and a relation parameter 1324 after a correction process is performed by the correction unit 614, such that they are associated with one another.

FIG. 14 schematically shows one example of a data table 1400. The data table 1400 may be one example of area information stored in an area information storing unit 1016. In the present embodiment, the data table 1400 stores an area ID 1412 to respectively identify one or more local areas or wide areas, and a geographic range 1414 of the area identified by the area ID 1412, such that they are associated with each other.

According to the data table 1400, it can be understood that, for example, "the entire area of Tokyo" indicated by "A0002" of the area ID 1412 also is a wide area including local areas indicated by "A0003" and "A0004" of the area IDs 1412, and is also a local area included in "the entire area of Japan" indicated by "A0001" of the area ID 1412. Accordingly, for example, an area extracting unit 514 can refer to the data table 1400 and extract the local area included in the geographic range indicated by the input information from among one or more local areas.

FIG. 15 schematically shows one example of a data table 1500. The data table 1500 may be one example of parameter information stored in a parameter storing unit 1014. In the present embodiment, the data table 1500 respectively stores one or more relation parameters and terminal identification information of communication terminal 110 to which the relation parameter is applied, such that they are associated with each other. In the present embodiment, the data table 1500 stores a terminal ID 1512 to respectively identify one or more communication terminals 110 in a particular period, a valid period 1514 of the terminal ID 1512, a time segment 1516 to which a corresponding relation parameter is applied, a relation parameter 1522 before a correction process is performed by the correction unit 614, and a relation parameter 1524 after the correction process is performed by the correction unit 614, such that they are associated with one another.

Accordingly, for example, parameter extracting unit 516 can extract a relation parameter applied to a communication terminal 110 having a terminal ID of T0001 at 3:00 p.m. on Sep. 1, 2014. In the present embodiment, a case in which the terminal ID 1512 and the valid period 1514 of the terminal ID 1512 are used as terminal identification information of the communication terminal 110 is described. However, the terminal identification information of the communication terminal 110 is not limit to the present embodiment.

While the embodiments of the present invention have been described, the technical scope of the invention is not limited to the above described embodiments. It is apparent to persons skilled in the art that various alterations and improvements can be added to the embodiments described above. Also, matters explained with reference to a particular embodiment can be applied to other embodiments as long as such application does not cause a technical contradiction. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: communication network;
100: population estimating system;
110: communication terminal;
112: positional information acquiring unit;
114: log information generating unit;
116: communication controlling unit;
120: information collecting server;
122: log information collecting unit;
124: log information storing unit;
126: communication controlling unit;
130: population estimating server;
212: log information managing unit;
214: population information acquiring unit;
216: extracting unit;
218: parameter deriving unit;
222: population estimating unit;
224: storing unit;
226: communication controlling unit;
228: input unit;
312: log information acquiring unit;
314: log information interpolating unit;
316: terminal classifying unit;
410: log information;
412: log information;
414: log information;
416: log information;
418: log information;
420: log information;
432: log information;
434: log information;
436: log information;
512: terminal extracting unit;
514: area extracting unit;
516: parameter extracting unit;
612: proportionality factor deriving unit;
614: correction unit;
712: estimation value deriving unit;
714: area determining unit;
716: terminal quantity deriving unit;
800: data table;
812: terminal ID;
814: area ID;
900: data table;
912: area ID;
914: number;
1012: log information storing unit;
1014: parameter storing unit;
1016: area information storing unit;
1018: population information storing unit;
1100: data table;
1112: terminal ID;
1114: positional information;
1116: time information;
1200: data table;
1214: valid period;
1212: terminal ID;
1216: terminal ID;
1300: data table;
1312: parameter ID;
1314: area ID;
1316: time segment;
1322: relation parameter;
1324: relation parameter;
1400: data table;
1412: area ID;
1414: geographic range;
1500: data table;
1512: terminal ID;
1514: valid period;
1516: time segment;
1522: relation parameter;
1524: relation parameter

What is claimed is:

1. A population estimating apparatus comprising:
an input unit to input input information indicating a geographic range and time of population estimation;
a first terminal extracting unit to refer to a log information storing unit to store log information in which one or more pieces of positional information indicating each position of one or more wireless terminals are associated with time information indicating time at which each of the one or more pieces of positional information is acquired, and extract wireless terminals existing in a geographic range indicated by the input information at time indicated by the input information;
a relation parameter extracting unit to refer to a relation parameter storing unit to store a relation parameter predetermined for each wireless terminal, which represents relation between a number of wireless terminals and population, and extract a relation parameter applied to the wireless terminal extracted by the first terminal extracting unit; and
an estimation value deriving unit to derive an estimation value of a population in the geographic range indicated by the input information at the time indicated by the input information based on the relation parameter extracted by the relation parameter extracting unit.

2. The population estimating apparatus according to claim 1, wherein
the relation parameter storing unit stores the relation parameter associated with a time segment to which the relation parameter applies, and
the relation parameter extracting unit to refers to the relation parameter storing unit and extracts a relation parameter applied to a wireless terminal extracted by the first terminal extracting unit at the time indicated by the input information.

3. The population estimating apparatus according to claim 2, wherein the time segment that is predetermined is at least one selected from a group consisting of 1 day, 1 week, 1 month, 3 months, 6 months, 1 year, weekdays, holidays, and each day of a week, and each time period.

4. The population estimating apparatus according to claim 1, further comprising:
an interpolation information generating unit to generate, if a time interval indicated by time information included in two pieces of temporally continuous log information among a plurality of pieces of log information associated with at least one of the one or more wireless terminals is larger than a predetermined value, information for interpolating the two pieces of log information.

5. The population estimating apparatus according to claim 1, further comprising:
a population information acquiring unit to acquire local population information indicating a population of a local area having a predetermined geographic range;
a second terminal extracting unit to refer to the log information storing unit and extract wireless terminals existing in the local area at particular time; and
a relation parameter deriving unit to derive the relation parameter based on a population of the local area indicated by the local population information and a number of the wireless terminals extracted by the second terminal extracting unit, wherein
the relation parameter storing unit stores, with respect to at least a part of the wireless terminals extracted by the second terminal extracting unit, terminal identification information to identify the wireless terminals and a relation parameter derived by the relation parameter deriving unit such that they are associated with each other.

6. The population estimating apparatus according to claim 5, further comprising:
a classifying unit to classify each of the wireless terminals extracted by the first terminal extracting unit into wireless terminals that have stayed in the geographic range indicated by the input information and wireless terminals that have transited the geographic range indicated by the input information, based on the log information.

7. The population estimating apparatus according to claim 5, wherein the particular time is,
any time or period between 8:00 p.m. and 8:00 a.m.,
any time or period during business hours or open hours of a particular facility, or
any time or period during actual operation hours of a population movement survey.

8. The population estimating apparatus according to claim 5, wherein
the population information acquiring unit further acquires wide area population information indicating a population of a wide area including the local area, and
the relation parameter deriving unit has,
a proportionality factor deriving unit to derive a proportionality factor of the local area by dividing the population of the local area indicated by the local population information by a number of the wireless terminals extracted by the second terminal extracting unit, and
a correction unit to correct the proportionality factor based on the wide area population information and derive the relation parameter.

9. The population estimating apparatus according to claim 8, wherein the wide area population information includes,
de jure population information indicating a de jure population in the wide area, and
inflow population information indicating a population that flowed inside the wide area from outside the wide area.

10. A population estimating apparatus comprising:
a population information acquiring unit to acquire local population information indicating a population of a local area having a predetermined geographic range;
a second terminal extracting unit to refer to a log information storing unit to store log information in which one or more pieces of positional information indicating each position of one or more wireless terminals are associate with time information indicating time at which each of the one or more pieces of positional information is acquired, and extract wireless terminals existing in a local area at particular time;
a relation parameter deriving unit to derive a relation parameter, which is used for estimating population, representing a relation between a number of wireless terminals and a population, based on the population of the local area indicated by the local population information and a number of wireless terminals extracted by the second terminal extracting unit; and
a relation parameter storing unit to store, with respect to at least a part of the wireless terminals extracted by the second terminal extracting unit, terminal identification information to identify the wireless terminals and a relation parameter derived by the relation parameter deriving unit such that they are associated with each other.

11. The population estimating apparatus according to claim 10, wherein the particular time is,
any time or period between 8:00 p.m. to 8:00 a.m.,
any time or period during business hours or open hours of a particular facility, or
any time or period during actual operation hours of a population movement survey.

12. The population estimating apparatus according to claim 10, wherein
the population information acquiring unit further acquires wide area population information indicating a population of a wide area including the local area, and
the relation parameter deriving unit has,
a proportionality factor deriving unit to derive a proportionality factor of the local area by dividing the population of the local area indicated by the local population information by a number of the wireless terminals extracted by the second terminal extracting unit, and
a correction unit to correct the proportionality factor based on the wide area population information and derive the relation parameter.

13. A population estimating method comprising:
an inputting step to input input information indicating a geographic range and time of population estimation;
a first terminal extracting step to refer to a log information storing unit to store log information in which one or more pieces of positional information indicating each position of one or more wireless terminals are associated with time information indicating time at which each of the one or more pieces of positional information is acquired, and extract wireless terminals existing in a geographic range indicated by the input information at time indicated by the input information; and
a relation parameter extracting step to refer to a relation parameter storing unit to store a relation parameter predetermined for each wireless terminal, which represents relation between a number of wireless terminals and population, and extract a relation parameter applied to a wireless terminal extracted in the first terminal extracting step; and
an estimation value deriving step to derive an estimation value of a population in the geographic range indicated by the input information at the time indicated by the input information, based on the relation parameter extracted in the relation parameter extracting step.

14. The population estimating apparatus according to claim 12, wherein the wide area population information includes, de jure population information indicating a de jure population in the wide area, and inflow population information indicating a population that flowed inside the wide area from outside the wide area.

15. A non-transitory computer readable medium storing instructions that, when executed by a processor, cause the processor to perform operations comprising:

an inputting step to input input information indicating a geographic range and time of population estimation;

a first terminal extracting step to refer to a log information storing unit to store log information in which one or more pieces of positional information indicating each position of one or more wireless terminals are associated with time information indicating time at which each of the one or more pieces of positional information is acquired, and extract wireless terminals existing in a geographic range indicated by the input information at time indicated by the input information;

a relation parameter extracting step to refer to a relation parameter storing unit to store a relation parameter predetermined for each wireless terminal, which represents relation between a number of wireless terminals and population, and extract a relation parameter applied to a wireless terminal extracted in the first terminal extracting step; and an estimation value deriving step to derive an estimation value of a population in the geographic range indicated by the input information at the time indicated by the input information, based on the relation parameter extracted in the relation parameter extracting step.

16. A non-transitory computer readable medium storing instructions that, when executed by a processor, cause the processor to perform operations comprising:

a population information acquiring step to acquire local population information indicating a population of a local area having a predetermined geographic range;

a second terminal extracting step to refer to a log information storing unit to store log information in which one or more pieces of positional information indicating each position of one or more wireless terminals are associate with time information indicating time at which each of the one or more pieces of positional information is acquired, and extract wireless terminals existing in a local area at particular time;

a relation parameter deriving step to derive a relation parameter, which is used for estimating population, representing a relation between a number of wireless terminals and a population, based on the population of the local area indicated by the local population information and a number of wireless terminals extracted by the second terminal extracting unit; and a relation parameter storing step to store, with respect to at least a part of the wireless terminals extracted by the second terminal extracting unit, terminal identification information to identify the wireless terminals and a relation parameter derived by the relation parameter deriving unit such that they are associated with each other.

17. The population estimating method according to claim 13, further comprising:

a population information acquiring step to acquire local population information indicating a population of a local area having a predetermined geographic range;

a second terminal extracting step to refer to the log information storing unit and extract wireless terminals existing in the local area at particular time; and a relation parameter deriving step to derive the relation parameter based on the population of the local area indicated by the local population information and a number of the wireless terminals extracted in the second terminal extracting step, wherein the relation parameter storing unit stores, with respect to at least a part of the wireless terminals extracted in the second terminal extracting step, terminal identification information to identify the wireless terminals and a relation parameter derived in the relation parameter deriving step such that they are associated with each other.

18. The population estimating method according to claim 13, further comprising:

an interpolation information generating step to generate, if a time interval indicated by time information included in two pieces of temporally continuous log information among a plurality of pieces of log information associated with at least one of the one or more wireless terminals is larger than a predetermined value, information for interpolating the two pieces of log information.

* * * * *